(12) United States Patent
D'Angelo et al.

(10) Patent No.: US 12,064,827 B1
(45) Date of Patent: Aug. 20, 2024

(54) METHODS, SYSTEMS, AND APPARATUS FOR JOINING METALLIC FABRICS

(71) Applicant: Garvey Holding LLC, Beavercreek, OH (US)

(72) Inventors: Joseph D'Angelo, Beavercreek, OH (US); Nathan Pinion, Springboro, OH (US); Shawn Page, Columbus, OH (US); James Mauer, Centerville, OH (US); Philip Garland, Woodstock, OH (US)

( * ) Notice: Subject to any disclaimer, the term of this patent is extended or adjusted under 35 U.S.C. 154(b) by 0 days.

(21) Appl. No.: 17/838,092

(22) Filed: Jun. 10, 2022

Related U.S. Application Data

(60) Provisional application No. 63/210,061, filed on Jun. 13, 2021.

(51) Int. Cl.
  *B23K 1/00* (2006.01)
  *B23K 3/047* (2006.01)
  *B23K 101/22* (2006.01)

(52) U.S. Cl.
  CPC .......... *B23K 1/0008* (2013.01); *B23K 3/0478* (2013.01); *B23K 2101/22* (2018.08)

(58) Field of Classification Search
  CPC ............... B23K 1/0008; B23K 3/0478; B23K 2101/22; B23K 1/00–206
  See application file for complete search history.

(56) References Cited

U.S. PATENT DOCUMENTS

| | | | | | |
|---|---|---|---|---|---|
| 1,646,842 | A | * | 10/1927 | Whiting | B23K 1/00 228/192 |
| 2,694,852 | A | * | 11/1954 | Rogers | B23K 35/001 428/673 |
| 3,031,996 | A | * | 5/1962 | Botvin | B23K 35/0222 428/605 |
| 3,061,912 | A | * | 11/1962 | Kalil | B22F 3/002 29/896.6 |
| 3,276,103 | A | * | 10/1966 | Kopke | B23K 20/04 228/262.44 |
| 3,454,374 | A | * | 7/1969 | Domin | B23K 35/001 428/673 |
| 3,555,665 | A | * | 1/1971 | Kelley, Jr. | B23K 1/0008 245/10 |
| 3,627,191 | A | * | 12/1971 | Hood, Jr. | B23K 3/08 228/19 |
| 3,730,761 | A | * | 5/1973 | Smith | C23C 2/08 427/601 |
| 4,078,714 | A | * | 3/1978 | Spirig | B23K 1/018 228/19 |

(Continued)

FOREIGN PATENT DOCUMENTS

| | | | | | |
|---|---|---|---|---|---|
| BR | 9304657 | A | * | 6/1995 | |
| CA | 2254676 | A1 | * | 6/1999 | ............ B23K 1/008 |

(Continued)

*Primary Examiner* — Kiley S Stoner

(57) ABSTRACT

Example embodiments of the present disclosure relate to methods, systems, and apparatus for joining metallic fabrics. The method includes applying heat to at least one of a fusible metal or alloy, a first metallic fabric, and a second metallic fabric with the fusible metal or alloy and the first and second metallic fabrics being in thermal communication. The first and second metallic fabrics are joined with the fusible metal or alloy.

20 Claims, 18 Drawing Sheets

(56) References Cited

U.S. PATENT DOCUMENTS

| | | | | | |
|---|---|---|---|---|---|
| 4,083,090 | A | * | 4/1978 | Duvekot | B29C 66/69<br>28/106 |
| 4,089,453 | A | * | 5/1978 | Jenkins | B23K 1/19<br>228/154 |
| 4,130,233 | A | * | 12/1978 | Chisholm | B23P 15/26<br>228/183 |
| 4,144,404 | A | * | 3/1979 | De Groef | H01R 4/723<br>333/260 |
| 4,245,769 | A | * | 1/1981 | Meginnis | B23K 20/227<br>228/173.3 |
| 4,415,116 | A | * | 11/1983 | Norton | B23K 3/02<br>219/230 |
| 4,416,408 | A | * | 11/1983 | Spirig | B23K 3/08<br>228/264 |
| 4,506,820 | A | * | 3/1985 | Brucker | H05K 3/3452<br>118/406 |
| RE32,086 | E | * | 2/1986 | Spirig | B23K 3/08<br>228/264 |
| 4,858,310 | A | * | 8/1989 | Sanders | H01R 43/0235<br>228/259 |
| 4,993,620 | A | * | 2/1991 | Kornely, Jr. | C25D 5/50<br>228/175 |
| 5,083,698 | A | * | 1/1992 | Forsha | B23K 26/18<br>228/19 |
| 5,094,139 | A | * | 3/1992 | Forsha | B23K 1/018<br>228/19 |
| 5,192,623 | A | * | 3/1993 | Gewelber | B23K 1/19<br>52/791.1 |
| 5,305,941 | A | * | 4/1994 | Kent | B23K 1/018<br>228/19 |
| 6,095,400 | A | * | 8/2000 | Liu | B23K 35/0222<br>228/56.3 |
| 6,221,507 | B1 | * | 4/2001 | Gewelber | B23K 35/002<br>228/252 |
| 6,730,848 | B1 | * | 5/2004 | Antaya | B23K 1/0008<br>174/94 R |
| 11,660,582 | B2 | * | 5/2023 | Choi | B01J 35/1085<br>228/246 |
| 2006/0081680 | A1 | * | 4/2006 | Yoshimura | B23K 1/018<br>228/19 |
| 2006/0186172 | A1 | * | 8/2006 | Klein | D04C 1/06<br>228/19 |
| 2010/0187290 | A1 | * | 7/2010 | Holi | B23P 6/002<br>228/119 |
| 2012/0328419 | A1 | * | 12/2012 | Riggi, Jr. | B23K 15/006<br>277/654 |
| 2013/0018318 | A1 | * | 1/2013 | Ravichandran | A61M 25/0012<br>604/171 |
| 2014/0111956 | A1 | * | 4/2014 | Taniguchi | H01L 24/83<br>228/249 |
| 2016/0052194 | A1 | * | 2/2016 | Nakai | B29C 66/8223<br>228/1.1 |
| 2017/0125924 | A1 | * | 5/2017 | Lalitha | C22C 28/00 |
| 2017/0368646 | A1 | * | 12/2017 | Ryon | B23K 1/0018 |
| 2019/0030653 | A1 | * | 1/2019 | Homer | H01L 23/36 |
| 2019/0143459 | A1 | * | 5/2019 | Bruck | B23K 35/0233<br>228/121 |
| 2019/0388867 | A1 | * | 12/2019 | Choi | B01J 35/026 |
| 2020/0307161 | A1 | * | 10/2020 | Kuo | D03D 1/0088 |

FOREIGN PATENT DOCUMENTS

| | | | | | |
|---|---|---|---|---|---|
| CA | 2646752 | A1 | * | 7/2009 | B22F 7/062 |
| CN | 1621603 | A | * | 6/2005 | |
| CN | 104095712 | A | * | 10/2014 | A61F 13/49413 |
| CN | 104582650 | A | * | 4/2015 | A61F 13/15577 |
| CN | 103225176 | B | * | 6/2015 | |
| CN | 104674759 | A | * | 6/2015 | |
| CN | 105458438 | A | * | 4/2016 | |
| CN | 106592647 | A | * | 4/2017 | E02D 31/00 |
| CN | 107186307 | A | * | 9/2017 | B23K 1/0014 |
| CN | 107297598 | A | * | 10/2017 | B23K 1/008 |
| CN | 110948070 | A | * | 4/2020 | |
| CN | 111390314 | A | * | 7/2020 | |
| CN | 107177935 | B | * | 11/2021 | B65D 65/38 |
| DE | 102007008341 | A1 | * | 8/2008 | B23K 1/0012 |
| DE | 102009033207 | A1 | * | 1/2011 | B01D 53/885 |
| DE | 102015200853 | A1 | * | 7/2016 | |
| EP | 2450142 | A2 | * | 5/2012 | B23K 1/0018 |
| EP | 2450471 | A1 | * | 5/2012 | B22F 3/26 |
| EP | 3705612 | A1 | * | 9/2020 | D03D 1/0088 |
| EP | 3789149 | A1 | * | 3/2021 | B23K 1/19 |
| FR | 2874246 | A1 | * | 2/2006 | F16L 1/032 |
| JP | 62220269 | A | * | 9/1987 | |
| JP | 2005342419 | A | * | 12/2005 | |
| JP | 6793751 | B2 | * | 12/2020 | A45C 13/001 |
| KR | 20130072532 | A | * | 7/2013 | |
| KR | 20140015818 | A | * | 2/2014 | |
| RU | 71863 | U1 | * | 3/2008 | |
| RU | 142048 | U1 | * | 6/2014 | |
| RU | 2013100693 | A | * | 7/2014 | |
| RU | 154009 | U1 | * | 8/2015 | |
| RU | 2794581 | C1 | * | 4/2023 | |
| WO | WO-9323981 | A1 | * | 11/1993 | B23K 1/0002 |
| WO | WO-2011076402 | A1 | * | 6/2011 | B21C 37/0815 |
| WO | WO-2021025081 | A1 | * | 2/2021 | B23K 1/0016 |

* cited by examiner

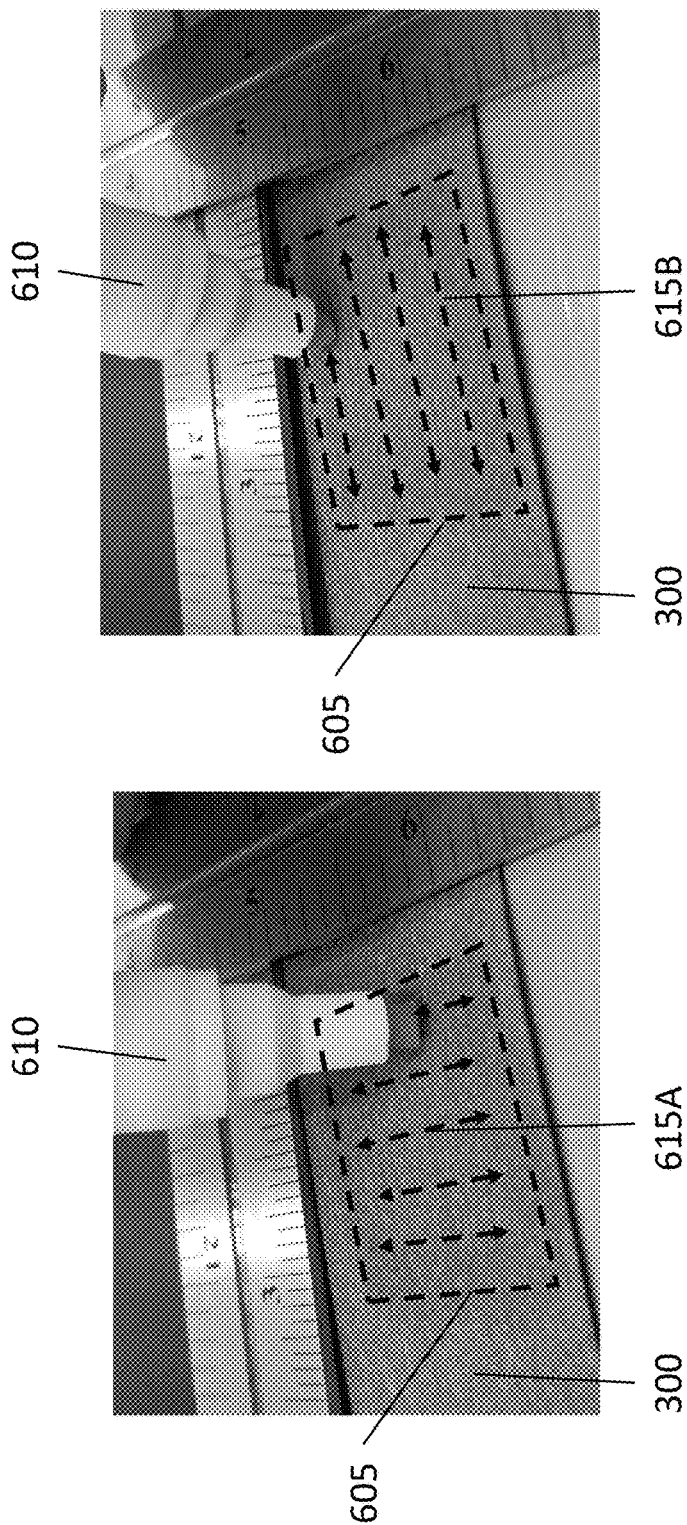
FIG. 6-1
FIG. 6-2
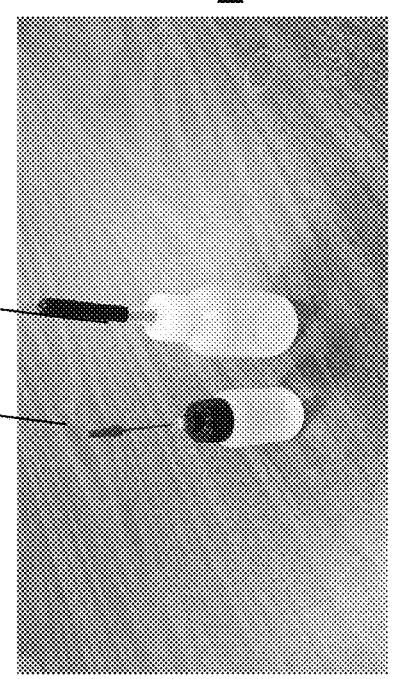
FIG. 6-3

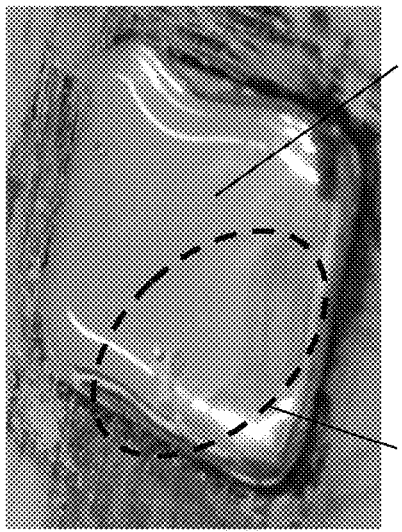
FIG. 7-1
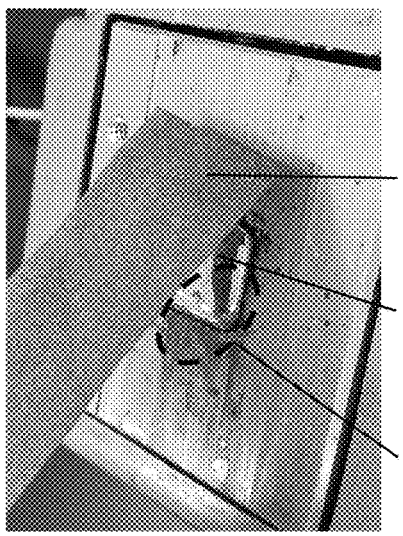
FIG. 7-2
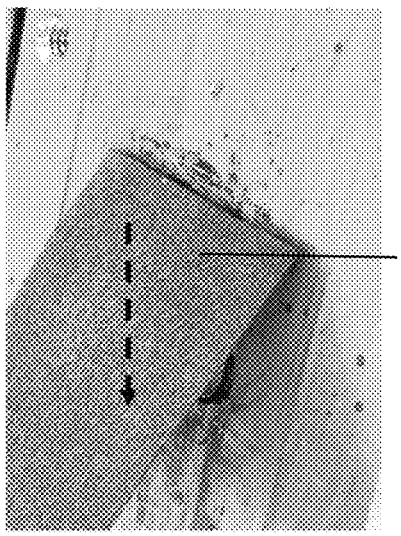
FIG. 7-3
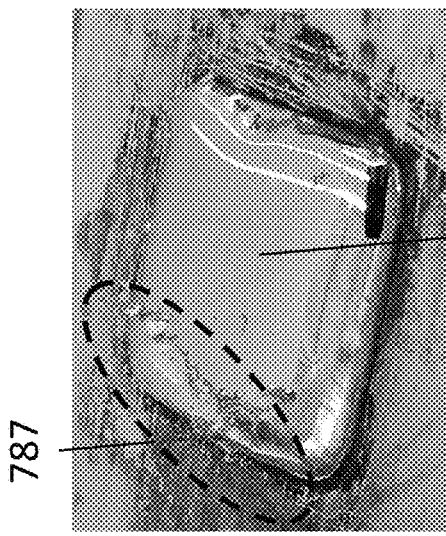
FIG. 7-5
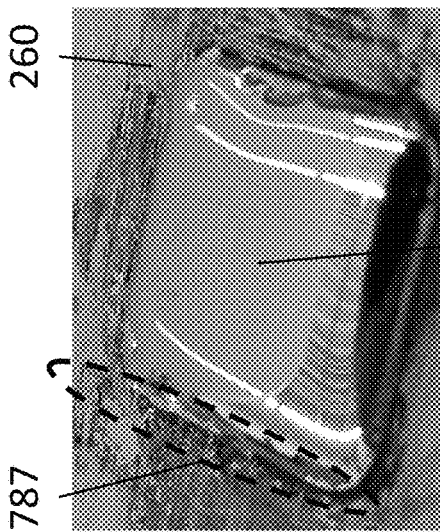
FIG. 7-6
FIG. 7-4

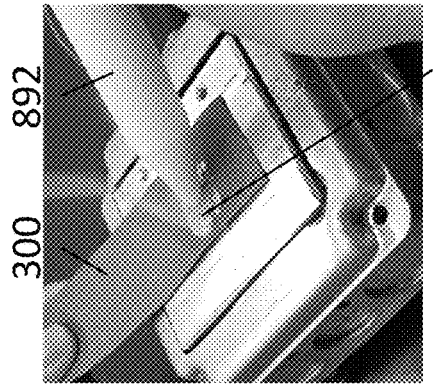
FIG. 8-1
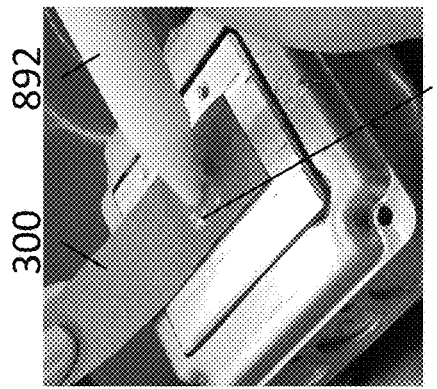
FIG. 8-2
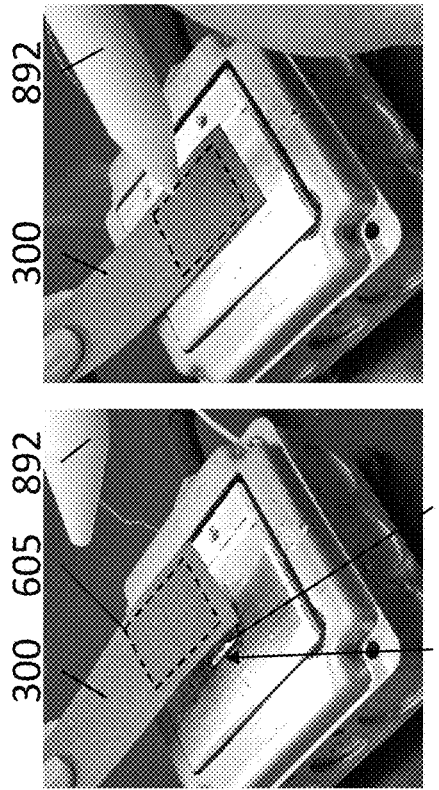
FIG. 8-3
FIG. 8-4
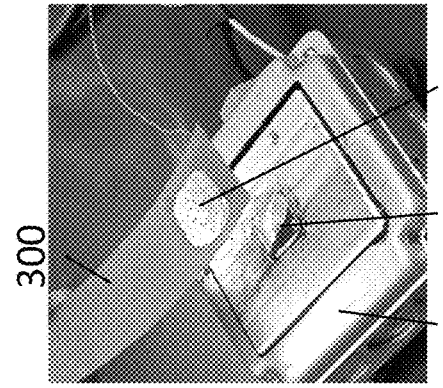
FIG. 8-5
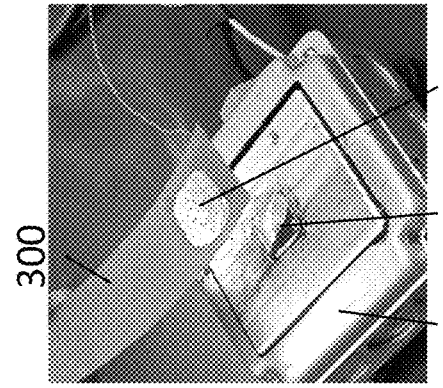
FIG. 8-6
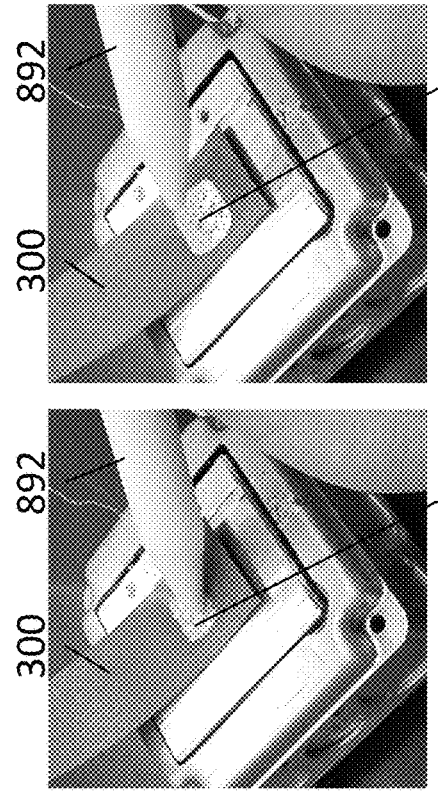
FIG. 8-7
FIG. 8-8

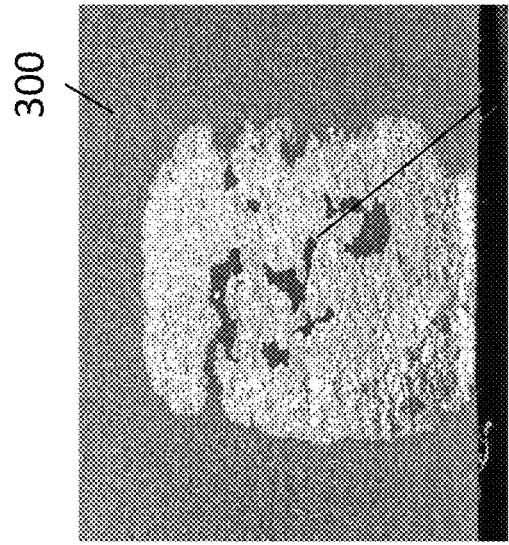 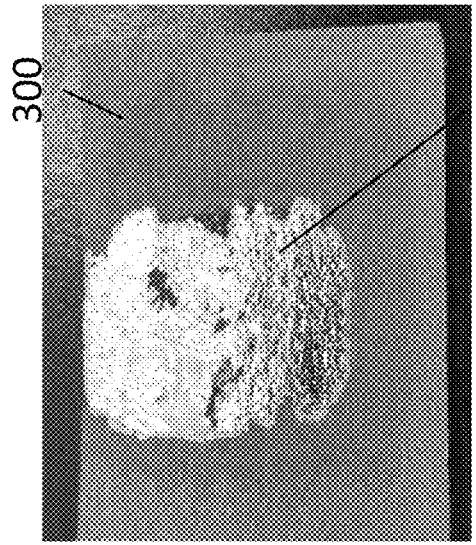
FIG. 10B  FIG. 10A-2
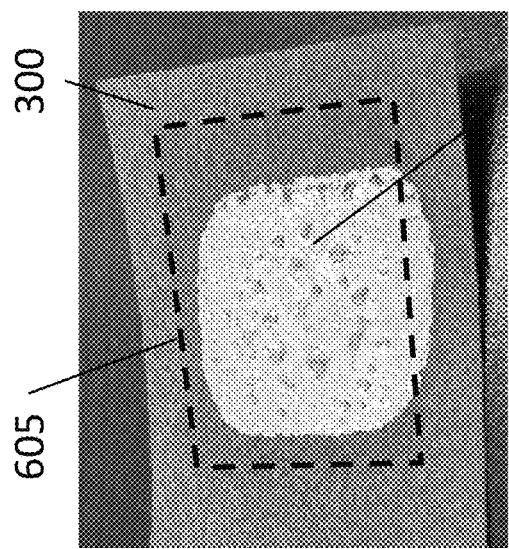 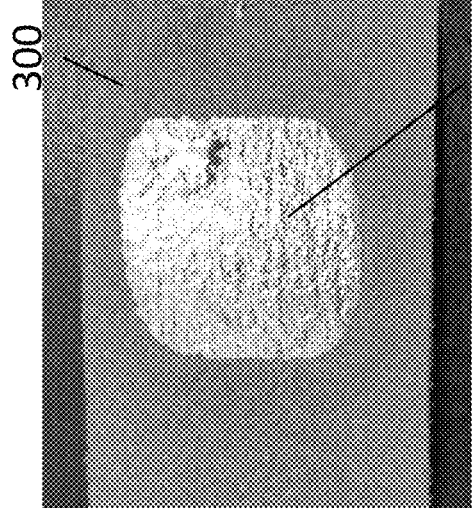
FIG. 10B'  FIG. 10A'-2
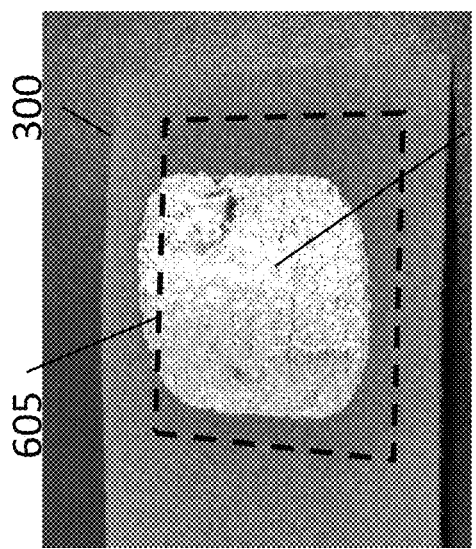 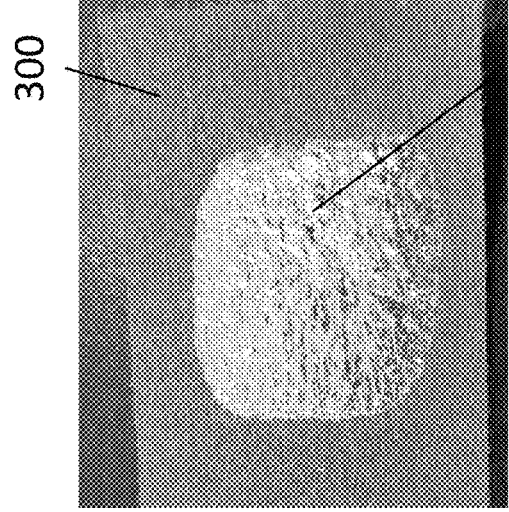
FIG. 10A-1  FIG. 10A'-1

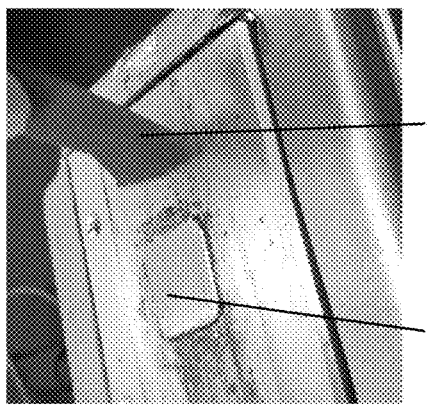
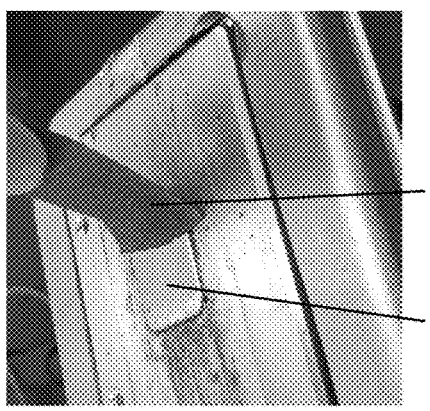
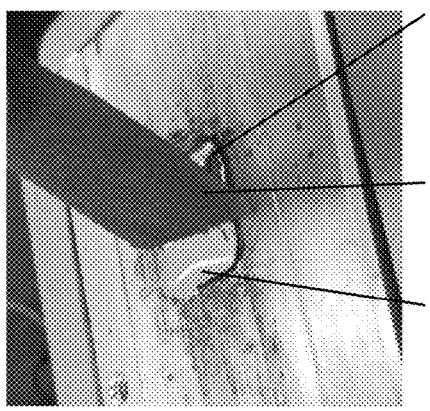
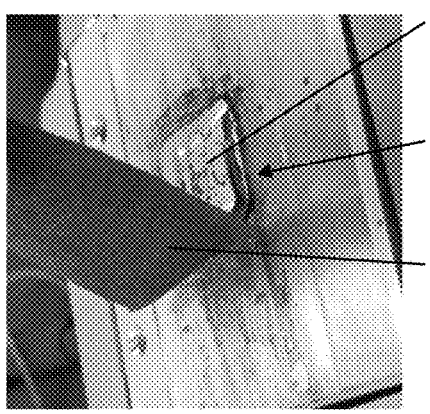
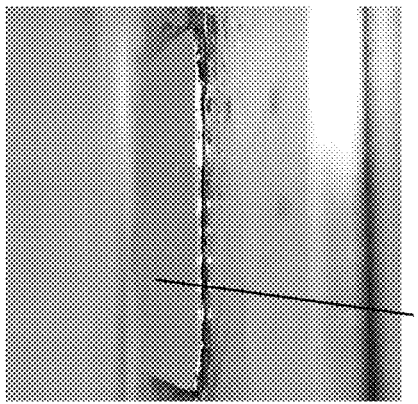
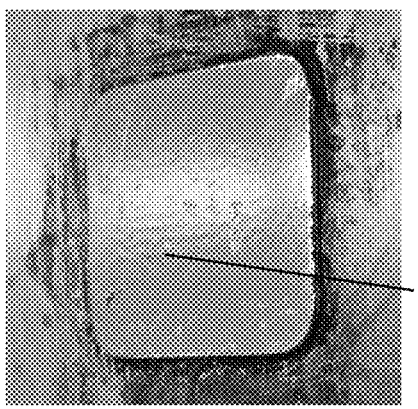
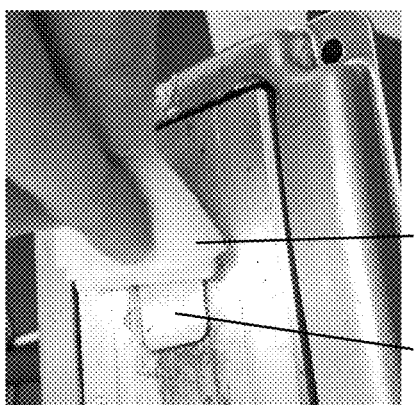
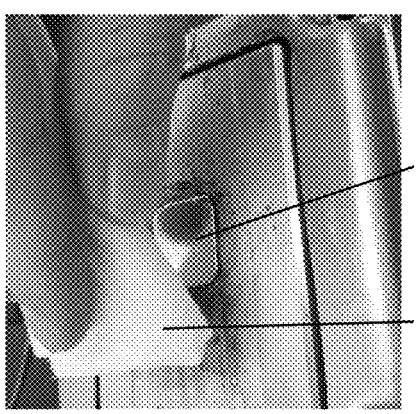

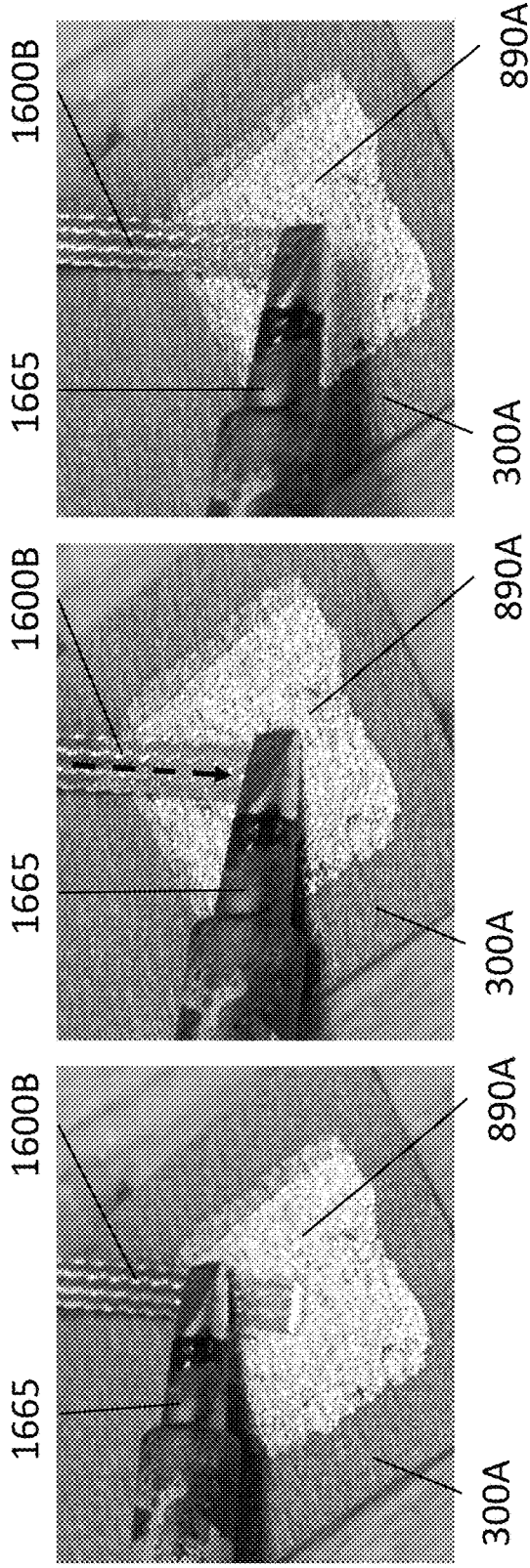
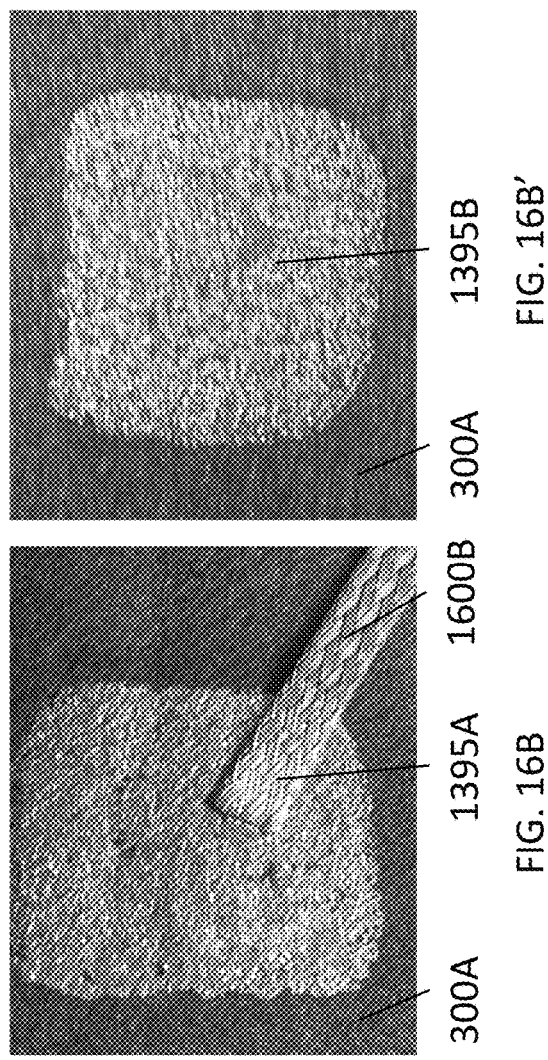

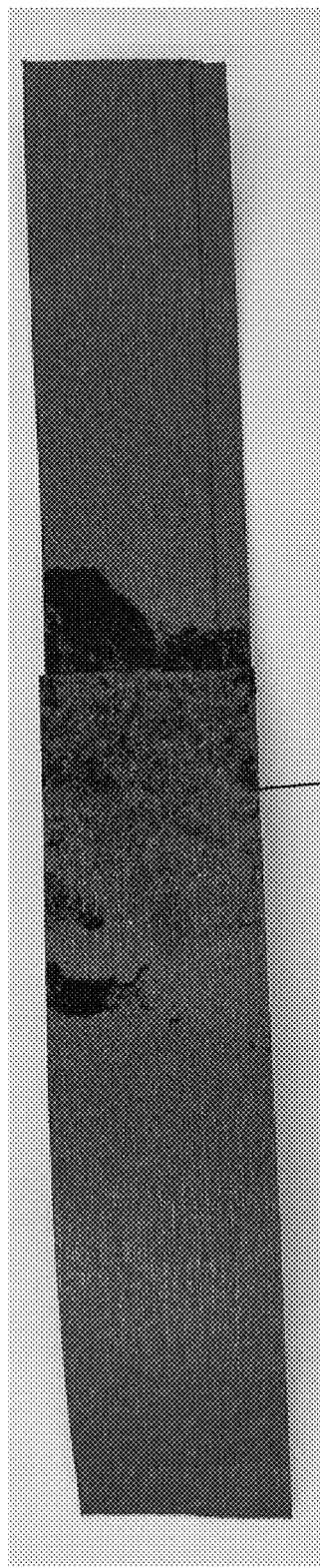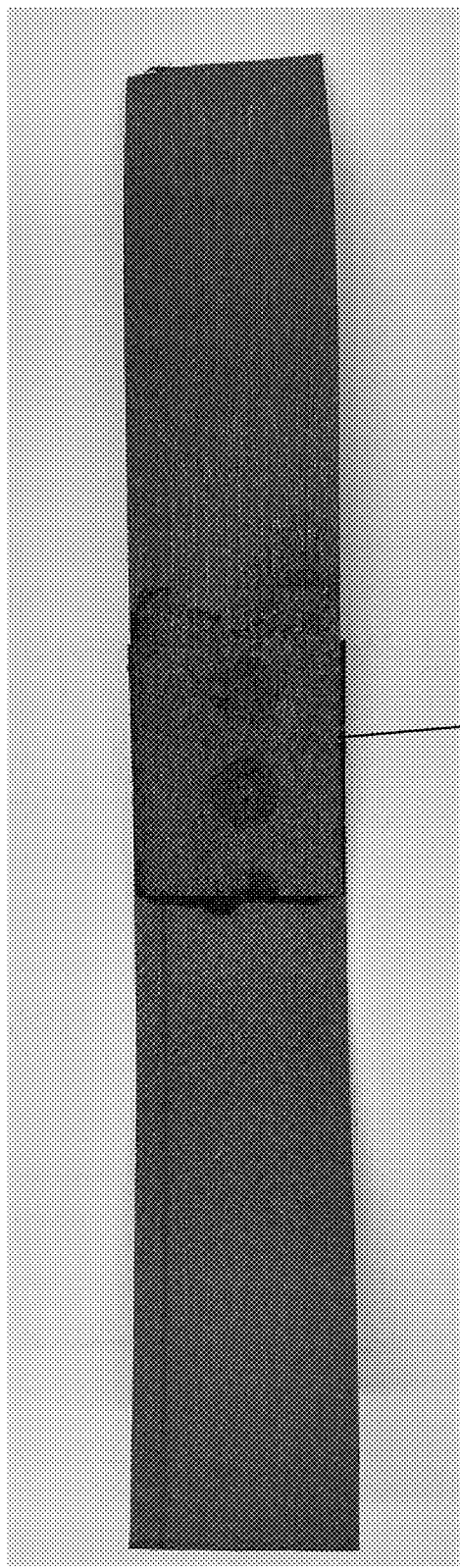
FIG. 18

METHODS, SYSTEMS, AND APPARATUS FOR JOINING METALLIC FABRICS

RELATED APPLICATIONS

This application claims priority to U.S. Provisional Patent Application No. 63/210,061 titled "Method, System, and Apparatus for Conductive Fabric" filed on Jun. 13, 2021, which is hereby incorporated in its entirety by reference for all purposes.

FIELD

Example embodiments of the present disclosure relate to methods, systems, and apparatus for joining metallic fabrics.

BACKGROUND

Systems often suffer from electromagnetic interference.

SUMMARY

Example embodiments of the present disclosure relate to methods, systems, and apparatus for joining metallic fabrics. In some embodiments, a method may include applying heat to at least one of a fusible metal or alloy, a first metallic fabric, and a second metallic fabric with the fusible metal or alloy and the first and second metallic fabrics being in thermal communication. In certain embodiments, a first and second metallic fabrics may be joined with a fusible metal or alloy.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 5A-1 and 5A-2 are illustrations of steps of applying solder to a heating block according to example embodiments of the present disclosure;

FIG. 5B is an illustration of solder inadequately applied to a heating block, according to an example embodiment of the present disclosure;

FIGS. 6-1 and 6-2 are illustrations of steps of applying flux to metallic fabrics according to example embodiments of the present disclosure;

FIGS. 6-3 is an illustration of bottles that may be used to apply flux, according to example embodiments of the present disclosure;

FIGS. 7-1 through 7-6 are illustrations of steps of removing slag from molten solder according to example embodiments of the present disclosure;

FIGS. 8-1 through 8-8 are illustrations of steps of preprocessing a metallic fabric according to example embodiments of the present disclosure;

FIGS. 10A-1 through 10A'-2 are illustrations of steps of cleaning flux from a preprocessed metallic fabric according to example embodiments of the present disclosure;

FIGS. 10B and 10B' are illustrations of respective sides of an unacceptable preprocessed metallic fabric according to example embodiments of the present disclosure;

FIGS. 11A-1 through 11B-2 are illustrations of steps of cleaning excess solder from a heating block according to example embodiments of the present disclosure;

FIGS. 11C and 11C' are illustrations of respective views of a clean heating block according to example embodiments of the present disclosure;

FIGS. 12-1 through 12-6 are illustrations of steps of applying flux to and aligning respective surfaces of preprocessed metallic fabrics according to example embodiments of the present disclosure;

FIGS. 13-1 through 13-6 are illustrations of steps of heating preprocessed metallic fabrics to join the metallic fabrics according to example embodiments of the present disclosure;

FIGS. 15-1 through 15'-2 are illustrations of steps of cleaning flux from joined metallic fabrics according to example embodiments of the present disclosure;

FIGS. 16A-1 through 16A-3 are illustrations of steps of heating surfaces of a preprocessed metallic braid and a preprocessed metallic fabric to join the braid and metallic fabric according to example embodiments of the present disclosure FIGS. 16B and 16B' are illustrations of a metallic braid and a metallic fabric joined according to example embodiments of the present disclosure; FIG. 18 illustrated two different views of joining metallic fabric with adhesive, according to example embodiments of the current disclosure.

DETAILED DESCRIPTION

In some embodiments, a metallic fabric may be used as an electromagnetic shield due to its conductive properties. In many embodiments, a metallic fabric may be cut into a shape specific to applications and may be cut in strips, curves, or other geometric shapes. In some embodiments, a metallic fabric may be selected to meet one or more specifications for conductivity, shielding effectiveness, durability to flexing, solderability, flame retardance, and resistance to contamination by lubricants and fuels. In certain embodiments, a metallic fabric may be sandwiched (e.g., similar to gaskets) and enclosed in a non-hermetic package. In other embodiments, storage requirements for a metallic fabric may be similar to other fabrics in terms of moisture and temperature tolerance. In most embodiments, handling procedures for a metallic fabric may require avoiding cutting and sharp folds. In most embodiments, the metallic fabric may be a non-woven material.

In many embodiments, a non-woven metallic fabric may present problems to join or create a union between two fabrics. In most embodiments, a non-woven fabric may not be stitched or joined at a seam as a woven fabric. In certain embodiments, a non-woven fabric may be joined with another non-woven fabric. In most embodiments, it may be possible to join non-woven fabrics through a joining process. In certain embodiments, a joining process may include a soldering process. In almost all embodiments herein, a non-woven fabric and a non-woven metallic fabric may be used interchangeable. In many embodiments, a metallic fabric may be used interchangeably with a non-woven metallic fabric. In some embodiments, techniques of the current disclosure may be used on woven and non-woven fabrics metallic fabrics.

Figure 1:
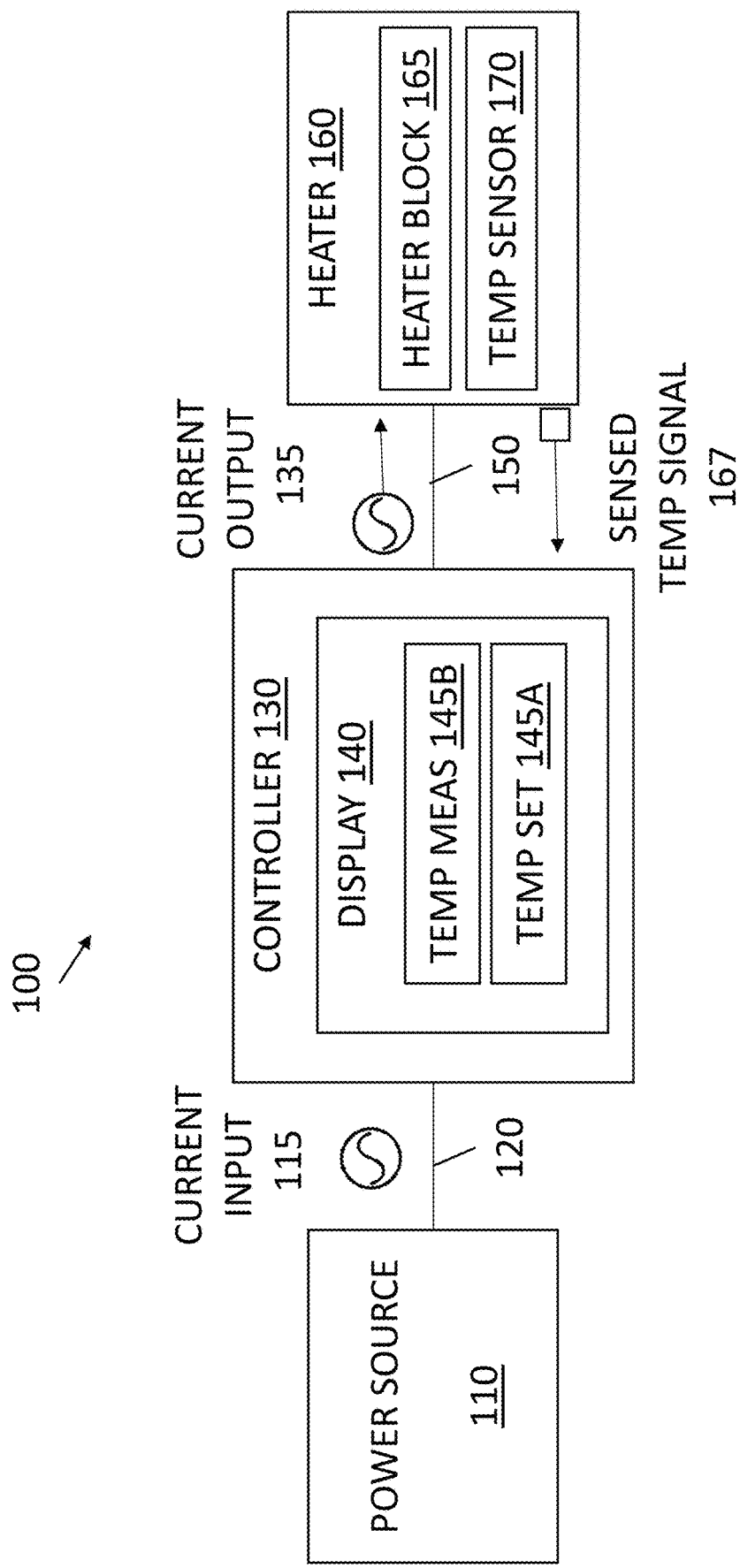
FIG. 1 is a block diagram of a system for joining metallic fabrics according to an example embodiment of the present disclosure.
Figure 2:
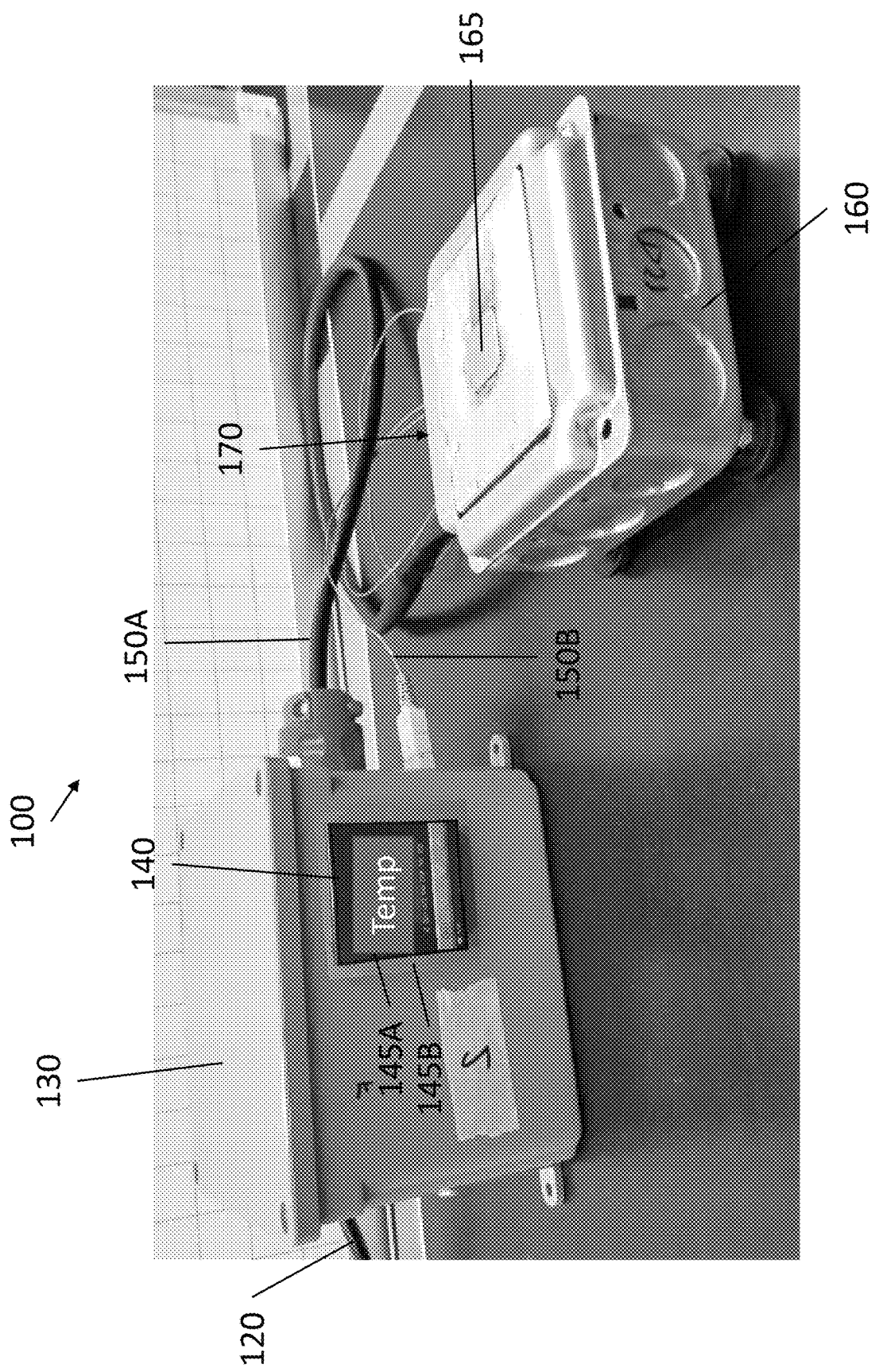
FIG. 2 is an illustration of a system for joining metallic fabrics according to an example embodiment of the present disclosure.

FIG. 1 is a block diagram of an example embodiment of a system 100 for joining non-woven metallic fabric according to an example embodiment of the present disclosure. FIG. 2 is an of an example embodiment of an illustration of a system 200 for joining metallic fabrics according to an example embodiment of the present disclosure. The example embodiments of FIGS. 1 and 2 are discussed in conjunction below.

As illustrated in the example embodiments of FIGS. 1 and 2, system 100 includes controller 130 connected to power source 110 (e.g., a source of alternating current (AC) input power 115) via power cable 120. Controller 130 also is connected to heater 160 via cable 150 and controls current output 135 heater 160 to control its temperature. Heater 160 includes heating block 165 and temperature sensor 170 (e.g., a thermocouple) which feeds back sensed temperature signal 167 of heating block 165 back to controller 130. Controller 130 includes display 140 and other user interface components (e.g., buttons, not shown) for displaying and entering setpoint temperature 145A as well as displaying measured temperature 145B measured by temperature sensor 170. Controller 130 maintains heating block 165 at or near its setpoint temperature 145A in a range defined by a melting point of the metallic fabric and a melting point of the fusible metal or alloy. In certain embodiments, different fusible metals or alloys have different melting points and, in certain embodiments, a fusible metal or alloy may be selected for its melting point low enough relative to the melting point of the metallic fabric to avoid melting, burning, or otherwise damaging the metallic fabric.

In some embodiments, a controller may be a proportional-integral-derivative (PID) control unit which may use control loop mechanism employing feedback. In other embodiments, a controller may be a multi-loop controller that can operate stand alone or with a PLC or microprocessor. In certain embodiments, a temperature controller may use a simpler set point controller and temperature sensors.

Referring back to the example embodiments of FIGS. 1 and 2, and as shown on display 140, controller 130 is set to maintain heating block 165 at a predetermined setpoint temperature 145A and temperature sensor 170 (not visible) feeds back a sensed temperature signal 167 interpreted by controller 130 and displayed as a measured temperature 145B. In certain embodiments, heating block 165 may draw approximately 150 watts at 1.25 amps. In certain embodiments, it may take approximately fifteen minutes for heating block 165 to reach its operating temperature and ambient environmental conditions may vary the amount of time necessary for heating block 165 to warm up.

Figure 3A:
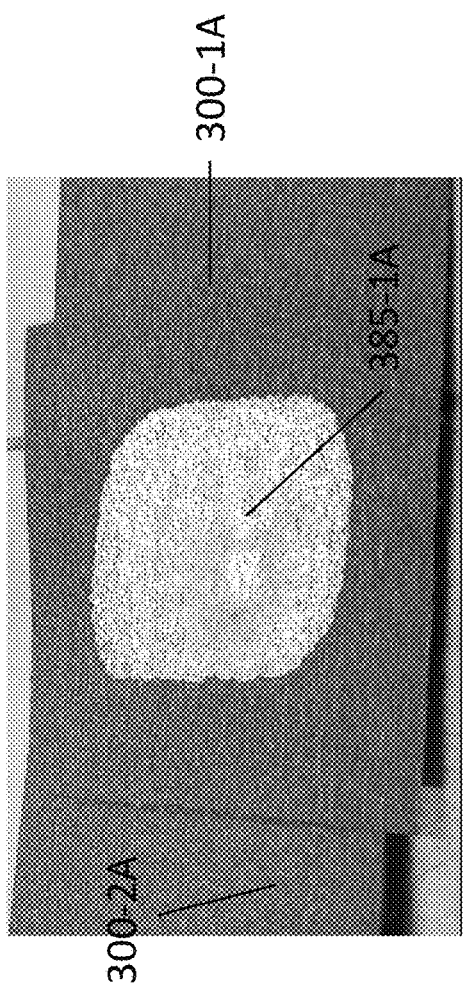
FIGS. 3A and 3B are illustrations of metallic fabrics joined according to respective example embodiments of the present disclosure.
Figure 3B:
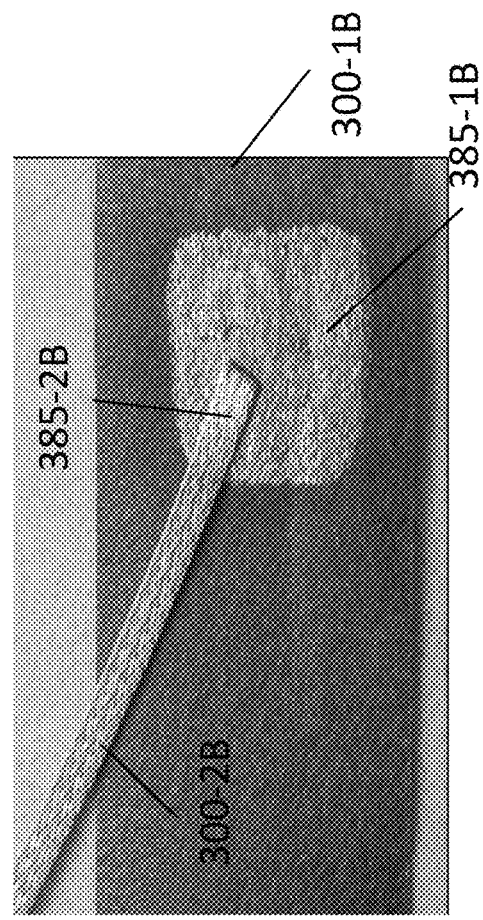

The example embodiments of FIGS. 3A and 3B are illustrations of metallic fabrics 300-1A/300-2A, 300-1B/300-2B (300, generally) joined according to respective example embodiments of the present disclosure. In certain embodiments, a metallic fabric may be a polymer nonwoven fabric which may be metalized with nickel (Ni)/copper (Cu), silver (Ag) over a base metal or other metal combinations. In alternate embodiments, a metallic fabric may be a woven metallic fabric. In other embodiments, a metallic fabric may be a metallic braid. In yet other embodiments, combinations of metalized nonwoven fabrics and metallic braids may be used.

As will be set out below in greater detail, and as illustrated in the example embodiments of FIGS. 3A and 3B, in many embodiments, due to characteristics of a metallic fabric, the metallic fabric pieces may be joined to provide continuous conductivity or electromagnetic shielding. In almost all embodiments, conductivity continuity of the joined pieces may be measured. In some embodiments, joining two metallic fabrics using a fusible metal or alloy (e.g., solder) may be enabled. In certain embodiments, two metallic fabric pieces may be prepared by melting a layer of fusible metal or alloy on respective defined areas of the two pieces of conductive fabric. In many embodiments, a fusible metal or alloy applied on a first side of a metallic fabric may penetrate the metallic fabric and be apparent on the opposite side of the metallic fabric.

As illustrated in the example embodiment of FIG. 3A, pieces of metallic fabric both may be nonwoven metallic fabric 300-1A, 300-2A. As illustrated in the example embodiment of FIG. 3B, one piece of metallic fabric is nonwoven metallic fabric 300-1B and the other piece of metallic fabric is metallic braid 300-2B. In certain embodiments, metallic braid 300-2B may be a Wesco aircraft braided ground strap.

Figure 4:
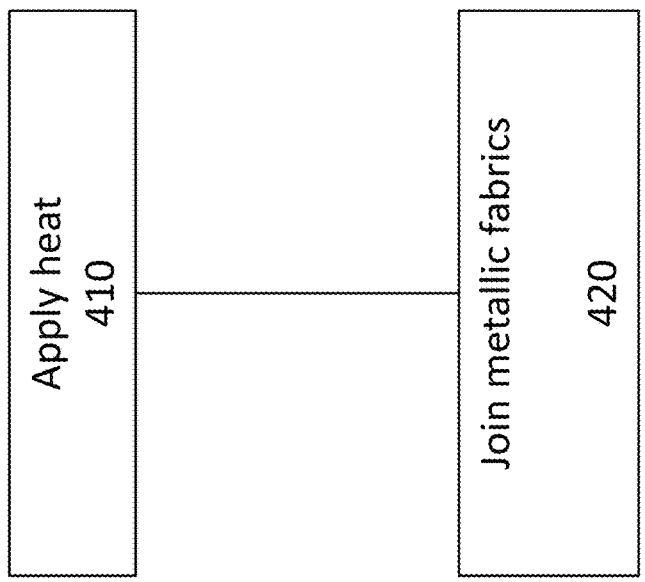
FIG. 4 is a flow diagram of a method for joining metallic fabrics according to an example embodiment of the present disclosure.

Refer now to the example embodiment of FIG. 4, which is a flow diagram of a method for joining metallic fabrics 300 according to an example embodiment of the present disclosure. Respective defined areas of two pieces of metallic fabric 300 are be aligned. Heat is applied to at least one of fusible metal or alloy 385, first metallic fabric 300-1A, 300-1B, and second metallic fabric 300-2A, 300-2B (step 410) which joins first and second metallic fabrics 300 with fusible metal or alloy 385 (step 420).

Figures 1, 2, 5A, 5B:
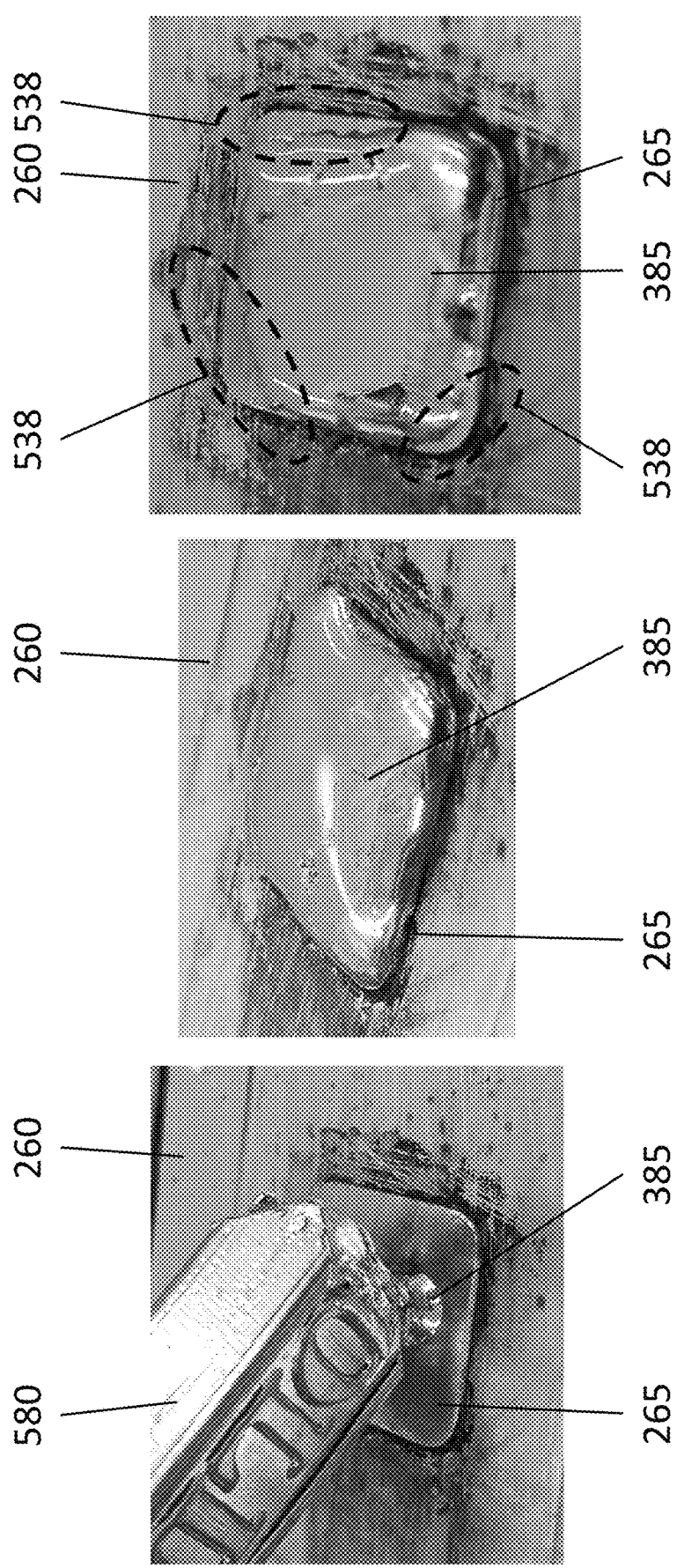

The example embodiments of FIGS. 5A-1 through 8-8 are illustrations of steps for preprocessing (i.e., tinning or creating a solder joint) a piece of metallic fabric 300 according to example embodiment methods of the present disclosure.

The example embodiments of FIGS. 5A-1 and 5A-2 are illustrations of steps of applying solder 580 to heating block 265 according to an example embodiment of the present disclosure. As illustrated in FIG. 5A-1, heating block 265 is generally square in shape; however, it should be understood that different shapes (e.g., oval) and numbers of heating pads (e.g., 2 or more) may be used. In FIGS. 5A-1 and 5A-2, solder 580 is melted such that molten solder 385 is loaded onto the heating block 265. Solder 580 is a 60/40 tin (Sn)/lead (Pb) solder bar. In other embodiments, solder may be another mix. In most embodiments, solder may not contain flux. As shown in the example embodiment of FIG.

5A-2, and in certain other embodiments, the result of melting solder 580 onto heating block 265 is a rounded puddle of molten solder 385 located on heating block 265 and not spilling into other areas of heater 260. Conversely, and as shown in the example embodiment of FIG. 5B, which is an illustration of solder 385 inadequately applied to a heating block 265, sufficient shoulder 580 should be applied to heating block 265 to prevent areas (in dashed outline) 538 on heating block 265 which don't have molten solder 385.

Figure 5C:
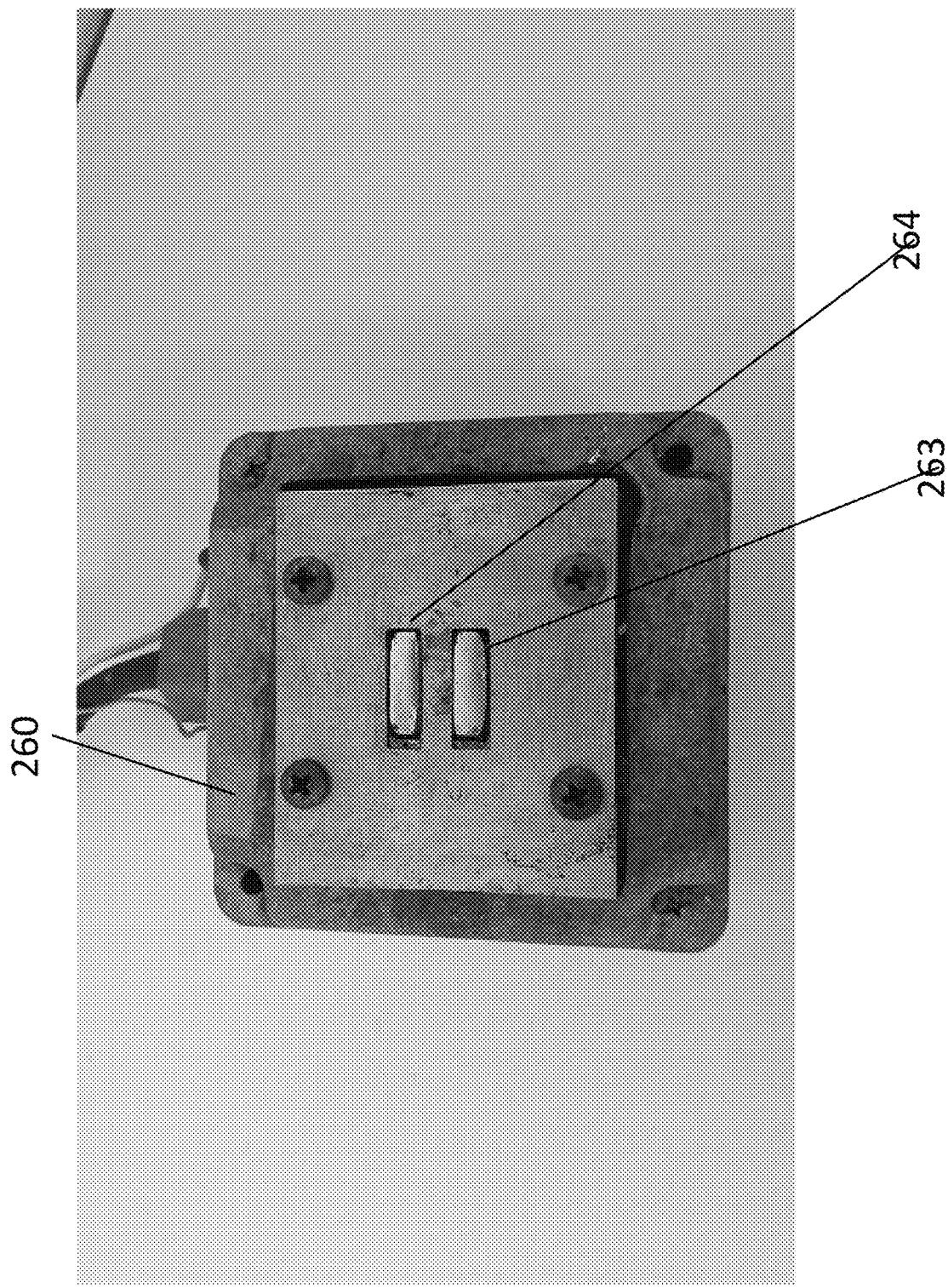
FIG. 5C is an illustration of a heating block, according to an example embodiment of the present disclosure.

Refer now to the example embodiment of FIG. 5C, which illustrates an alternative embodiment of a heater with two heating pads instead of a single heating pad. Heater 262 has heating pads 263 and 264. Referring back to FIG. 5A-2, heating block 265 has one heating pad. In almost all embodiments, a heater may have one or more heating pads.

Figures 3, 12:
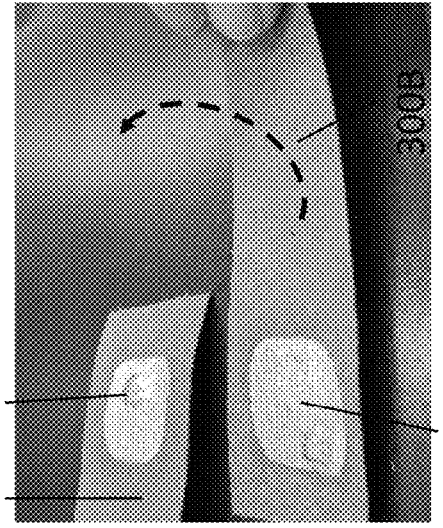
Figures 2, 12:
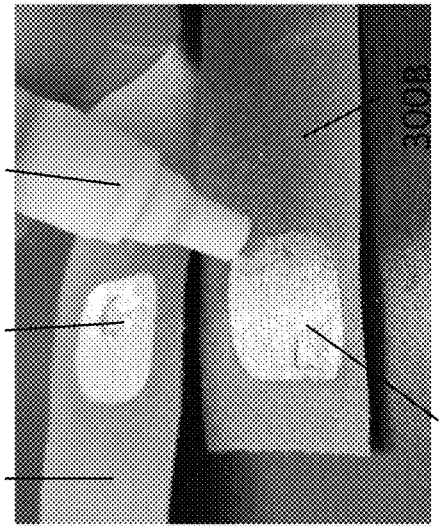
Figures 1, 12:
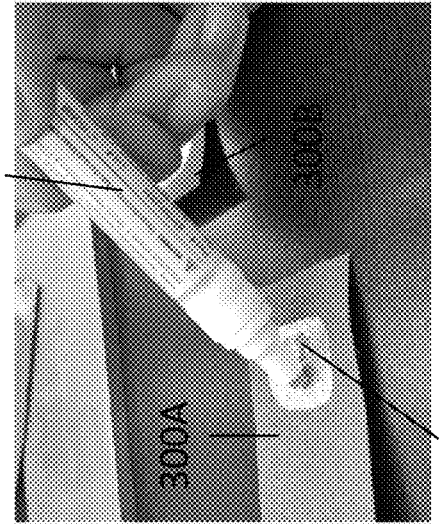
Figures 6, 12:
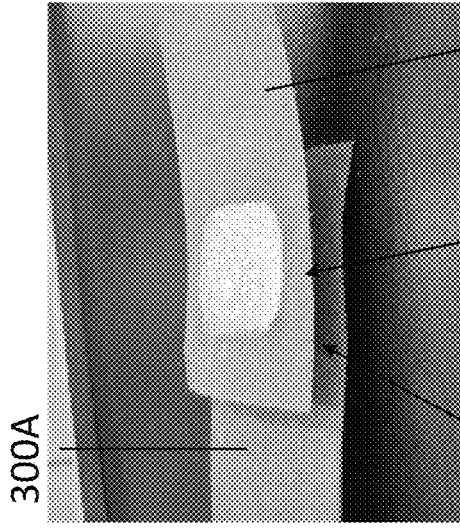

The example embodiments of FIGS. 6-1 and 6-2 are illustrations of steps of applying flux (such as Kester 2331-ZX) 610 to metallic fabrics 300 according to an example embodiment method of the present disclosure. As illustrated in FIGS. 6-1 and 6-2, flux 610 is applied to metallic fabric 300 in desired area 605 (e.g., approximately one inch square) in first direction 615A and in second (e.g., perpendicular) direction 615B. In certain embodiments, flux should not be applied to the edge of a metallic fabric which could result in an improper solder joint. Referring back to the example embodiments of FIGS. 6-1 and 6-2, flux 610 also is applied to the opposite side of the metallic fabric (not visible) in a manner similar to that illustrated and described with respect to FIGS. 6-1 and 6-2. It should be understood that, in certain embodiments and depending on amount of flux applied to metallic fabric, it may be necessary to wait a period of time (e.g., up to three minutes) for the flux applied to the metallic fabric to penetrate and remove oxides from the metallic fabric. Refer now to the example embodiment of FIG. 6-3. In the example embodiment of FIG. 6-3 are application bottles 611 and 612. In this embodiment, application bottles 611 and 612 are bottle droppers and may be used to apply flux.

Figures 5, 12:
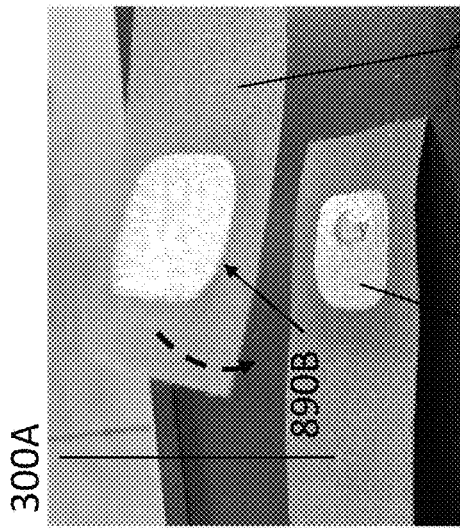
Figures 4, 12:
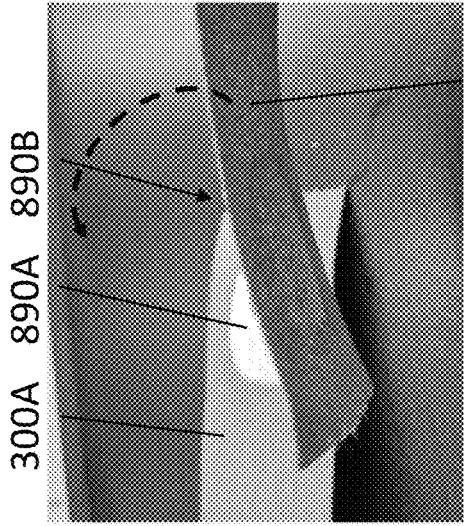

Refer now to the example embodiments FIGS. 7-1 through 7-6 that are illustrations of steps of removing slag 787 from molten solder 385. As illustrated in FIG. 7-1, contaminants or impurities in the molten solder 385 may form slag 787. In certain embodiments, as illustrated in FIGS. 7-2 through 7-4, slag 787 may be cleaned from molten solder 385 using, for example, a scrap piece of metallic fabric 700 so that puddle of molten solder 385 is shiny with no visible contamination floating on the surface. In the example embodiment of FIG. 7-1, the scrap piece of the metallic fabric 700 is brushed across the surface of puddle of molten solder 385 to gather slag 787 and remove it from the puddle of molten solder 385. As shown in the example embodiment of FIG. 7-5, some slag may remain on the puddle of molten solder 385 so, in certain embodiments, the steps illustrated in FIGS. 7-2 through 7-4 may be repeated until puddle of molten solder 385 is shiny and no further contaminants are visible as shown in the example embodiment of FIG. 7-6 with the collected contaminants removed from molten solder 385 to heater 260. In certain embodiments herein, the terms dross and slag may be used interchangeably.

Figure 9:
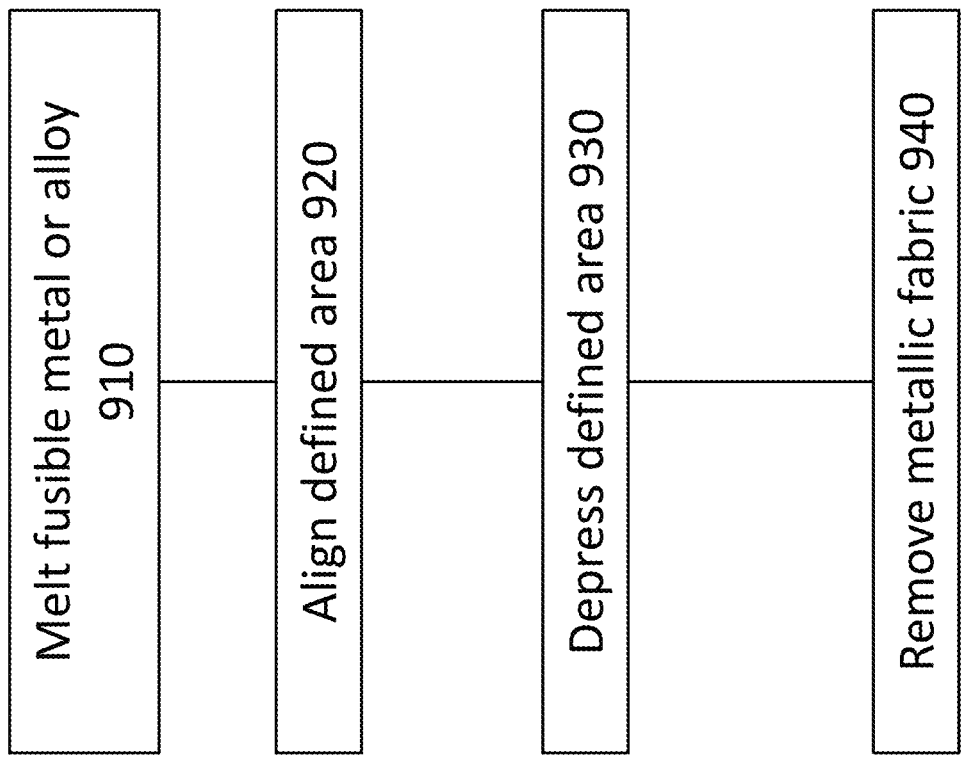
FIG. 9 is a flow diagram of a method for preparing a metallic fabric for joining and for preprocessing an area of a metallic fabric according to an example embodiment of the present disclosure.

FIGS. 8-1 through 8-8 are illustrations of steps of preprocessing a metallic fabric 300 according to example embodiments of the present disclosure. FIG. 9 is an example embodiment of a flow diagram of a method for preparing metallic fabric for joining and for preprocessing an area of metallic fabric according to an example embodiment of the present disclosure. The example embodiments of FIGS. 8-1 through 9 are described in conjunction. In certain embodiments, metallic fabric 300 is preprocessed by applying solder 890 to each piece (e.g., tinning) aids joining metallic fabrics 300, described below with reference to the example embodiments of FIGS. 13-1 through 13-6.

Referring to the example embodiments of FIGS. 8-1 through 9, with molten solder 385 applied to heating block 265 as described above with reference to the example embodiments of FIGS. 7-1 through 7-6 (step 910), a defined area 605 of a piece of metallic fabric 300 may be aligned over heating block 265 and molten solder 385 as shown in FIG. 8-1 (step 920). As shown in the example embodiment of FIG. 8-2, defined area 605 of piece of metallic fabric 300 is lowered onto and depressed into the molten solder 385 (not visible) (step 930). As shown in the example embodiments of FIGS. 8-3 through 8-7, a tool 892 is be used to further depress the defined area 605 of the metallic fabric 300 into the molten solder 385 to apply the molten solder 385 to the metallic fabric 300 by encouraging the molten solder 385 to wick through the metallic fabric 300. In certain embodiments, a tool, such as tool 892, may be made of polytetrafluoroethylene (PTFE) (e.g., Teflon® from E. I. du Pont de Nemours and Company) or another material having a high melting point to avoid contamination of the solder joint and may have a sloped end used to aid flow of the molten solder 385. Referring to the example embodiment of FIG. 8-8, metallic fabric 300 is removed from heating block 265 and heater 260 to cool (step 940).

FIGS. 10A-1 through 10A'-2 are illustrations of steps of cleaning flux 610 from preprocessed metallic fabric 300 according to example embodiments of the present disclosure. In certain embodiments, a defined area, such as defined area 605 of metallic fabric 605, may be cleaned with deionized water to remove excess flux. The example embodiments of FIGS. 10A-1 and 10A-2 illustrate a first side of metallic fabric 300 before and after cleaning, respectively. The example embodiments of FIGS. 10A'-1 and 10A'-2 illustrate an opposite side of metallic fabric 300 before and after cleaning, respectively. As can be seen in FIGS. 10A-1 and 10A'-1, there is excess flux in defined area 605 of metallic fabric 300 and excess flux puddles on the surface of solder 890 in defined area 605 of metallic fabric 300. Accordingly, FIGS. 10A-2 and 10A'-2 illustrate respective sides of acceptable preprocessed metallic fabric 300 having a completed solder joint 890. In other embodiments, distilled water may be used to remove excess flux.

Refer now to the example embodiments of FIGS. 10B and 10B' which are illustrations of respective sides of unacceptable preprocessed metallic fabric 300. As illustrated in FIGS. 10B and 10B', the preprocessing of metallic fabric 300 is unacceptable because solder 890 extends to the edge of metallic fabric 300 (caused by flux 610 going to the edge of the metallic fabric 300 and the metallic fabric 300 not being aligned properly over heating block 25) and because of incomplete solder 890 coverage on the metallic fabric 300 (caused by contaminants in the molten solder 385).

Refer to the example embodiments of FIGS. 11A-1 through 11B-2, which are illustrations of steps of cleaning excess solder 385 from heating block 265 according to an example embodiments of the present disclosure. As illustrated in FIGS. 11A-1 through 11A-4, heating block 265 is unloaded (i.e., cleaned of excess solder) by wiping molten solder 385 from the heating block using a scrap piece of metallic fabric 1100. As illustrated in FIGS. 11B-1 and 11B-2, heating block 265 is wiped with, for example, wet paper towel 1100'. One or both of these steps may be repeated as necessary until no puddles of molten solder 385 remain on heating block 265 as illustrated in the example embodiments of FIGS. 11C and 11C' which are illustrations of respective views of a clean heating block 265 according to example embodiments of the present disclosure.

Refer now to the example embodiments of FIGS. 12-1 through 12-6, which are illustrations of steps of applying flux 610 to and aligning respective surfaces of preprocessed metallic fabrics 300A, 300B according to example embodiments of the present disclosure. As illustrated in FIGS. 12-1 and 12-2, flux 620 is applied to the soldered/preprocessed surfaces 890A, 890B of pieces of metallic fabric 300A, 300B to be joined (i.e., on the respective faces of the metallic fabric 300A, 300B that are be touching). As illustrated in the example embodiments of FIGS. 12-3 through 12-5, one of the pieces of metallic fabric 300B may be flipped over so that the respective fluxed preprocessed surfaces 890A, 890B of the metallic fabric 300A, 300B to be joined are facing each other. As illustrated in the example embodiment of FIG. 12-6, pieces of metallic fabric 300A, 300B and particularly preprocessed surfaces 890A, 890B are aligned.

Figures 1, 13:
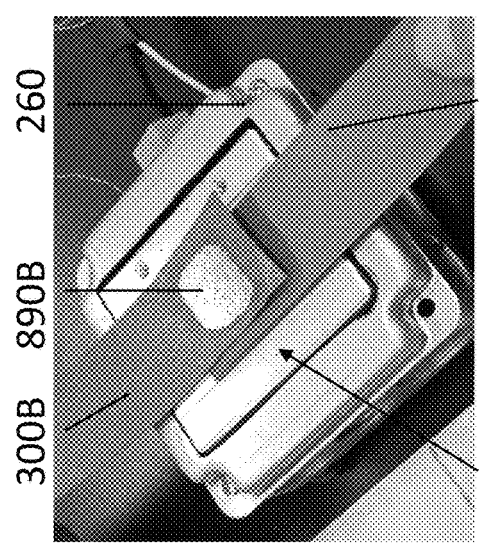
Figures 2, 13:
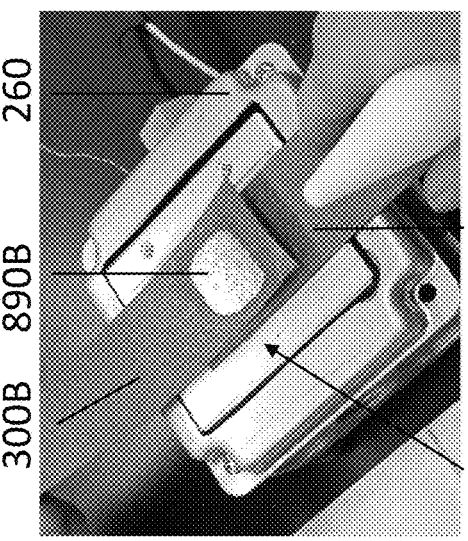
Figures 3, 13:
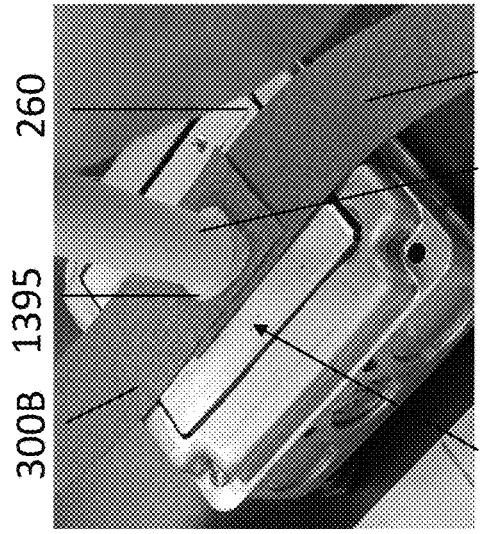
Figures 4, 13:
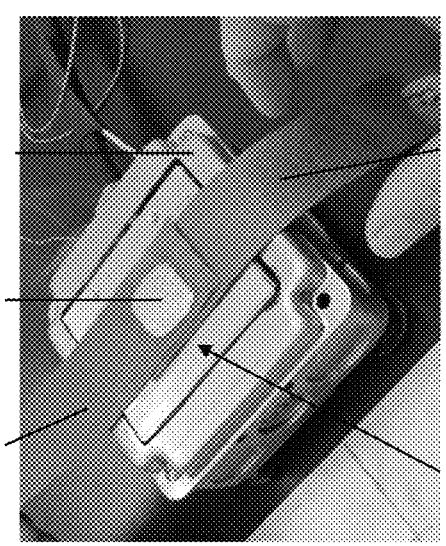
Figures 5, 13:
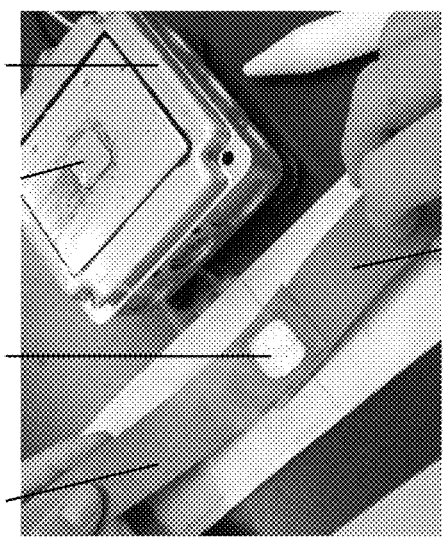
Figures 6, 13:
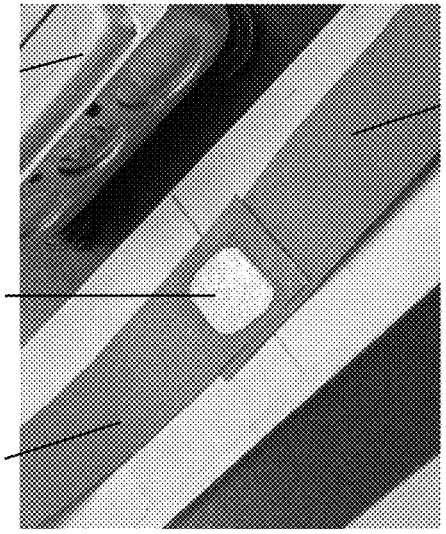
Figure 14:
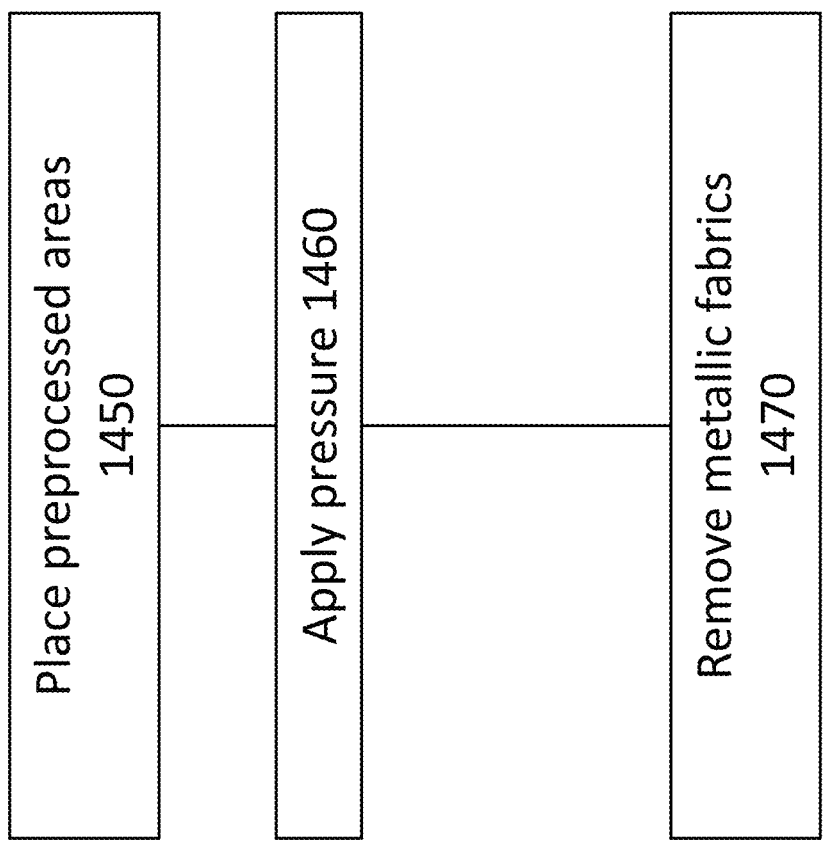
FIG. 14 is a flow diagram of a method for joining preprocessed metallic fabrics according to an example embodiment of the present disclosure.

Refer now to the example embodiments of FIGS. 13-1 through 13-6, which are illustrations of steps of heating preprocessed metallic fabrics 300A, 300B to join the metallic fabrics 300A, 300B according to example embodiments of the present disclosure. FIG. 14 is an example embodiment of a flow diagram of a method for joining preprocessed metallic fabrics 300A, 300B according to an example embodiment of the present disclosure. FIGS. 13-1 through 14 are described herein in conjunction.

As illustrated in the example embodiments of FIG. 13-1, overlapped and aligned pieces of metallic fabric 300A, 300B (e.g., from FIG. 12-6) are placed on heating block 265 (step 1450). Adjustments are made to the alignment as necessary as shown in the example embodiment of FIG. 13-2. As shown in the example embodiment of FIG. 13-3, pressure is applied to the aligned preprocessed areas 890A, 890B (not visible) of first and second metallic fabrics 300A, 300B on heating block 265 to encourage solder to reflow and join first and second metallic fabrics 300A, 300B (step 1460).

In certain embodiments, a tool, such as tool 892', may be used to apply pressure and the tool may be made of PTFE or another material having a high melting point to avoid contamination of the solder joint and may have a flat end used to evenly apply pressure over a solder joint. Referring back to the example embodiments of FIGS. 13-1-13-6 and FIG. 14, metallic fabrics 300A, 300B are joined as shown in FIG. 13-4 and are removed from heating block 265 as shown in the example embodiment of FIGS. 13-5 and 13-6 to cool (step 1470). In certain embodiments, when solder 1395 has visibly melted, pieces of metallic fabric 300A, 300B are removed from heating block 265 by sliding bottom piece 300A off heating block 265 while keeping top piece 300B aligned and, with solder 1395 remaining molten at this time, care should be taken to maintain alignment and avoid disturbance of the solder.

Figures 2, 15:
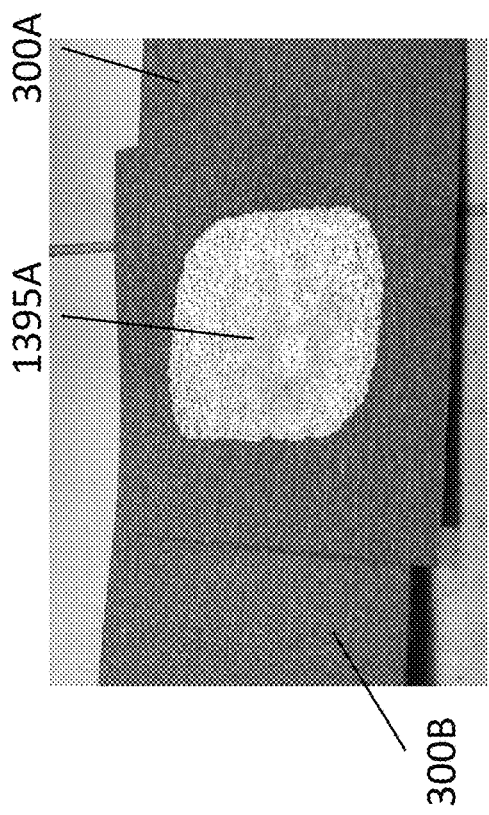
Figure 15:
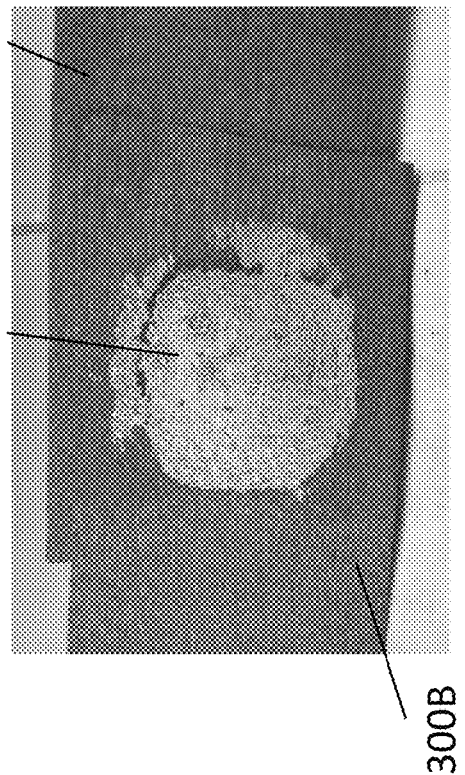
Figures 1, 15:
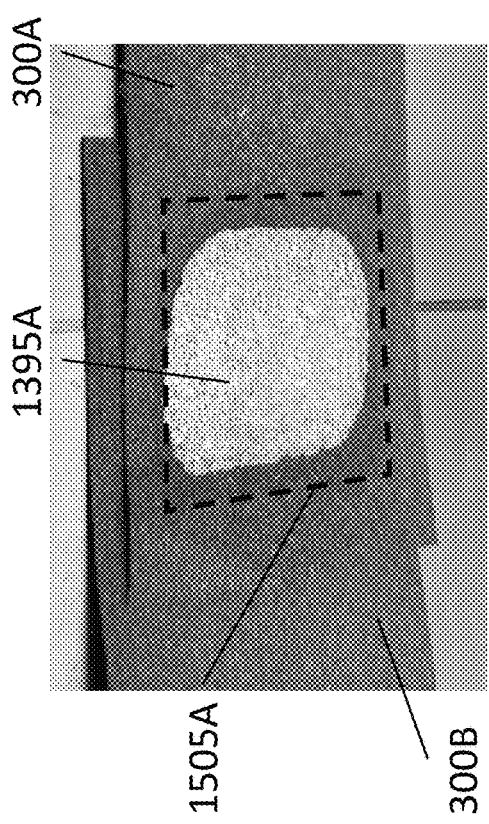
Figure 15:
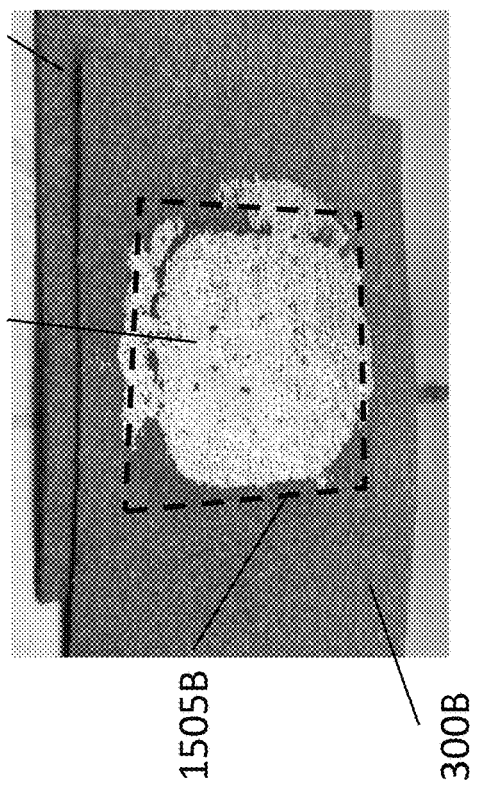

Refer now to the example embodiments of FIGS. 15-1 through 15'-2, which are illustrations of steps of cleaning flux 610 from joined metallic fabrics 300A, 300B according to example embodiments of the present disclosure. In certain embodiments, excess flux from joining the metallic fabrics 300A, 300B may be cleaned with deionized water. The example embodiments FIGS. 15-1 and 15-2 illustrate a first side of joined metallic fabrics 300A, 300B before and after cleaning, respectively. FIGS. 15'-1 and 15'-2 illustrate an opposite side of joined metallic fabrics 300A, 300B before and after cleaning, respectively. As can be seen in FIGS. 15-1 and 15'-1, there is excess flux in defined area 1505A, 1505B of metallic fabrics 300A, 300B. Accordingly, FIGS. 15-2 and 15'-2 illustrate respective sides 1395A, 1395B of an acceptable solder joint of joined metallic fabrics 300A, 300B. In other embodiments, excess flux may be cleaned with distilled water.

Figure 17:
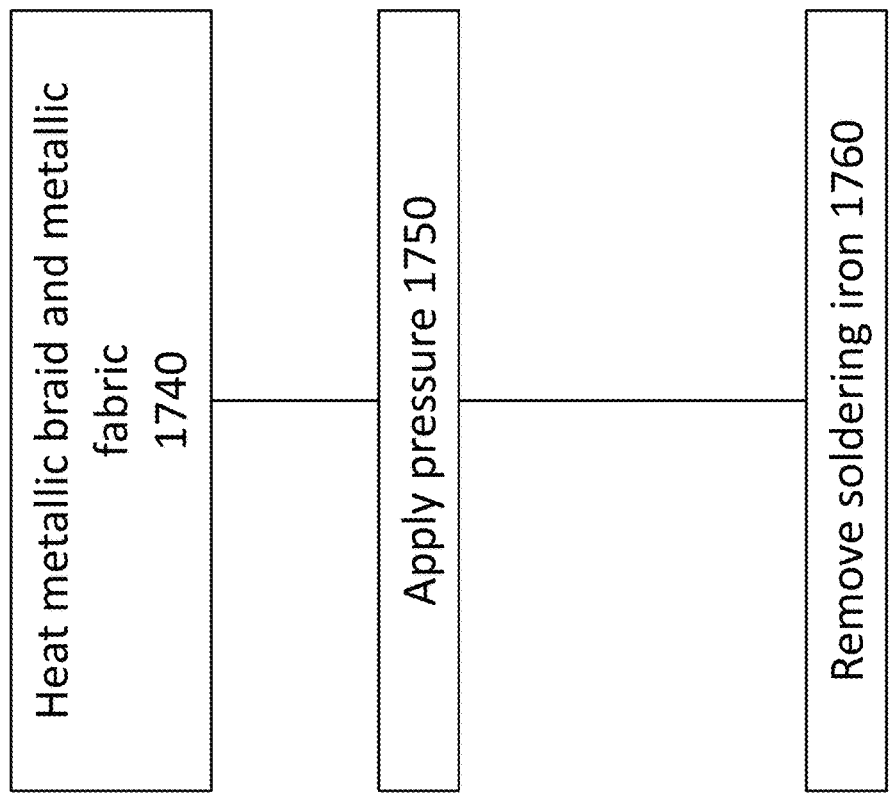
FIG. 17 is a flow diagram of a method for joining a preprocessed braid and a preprocessed metallic fabric according to an example embodiment of the present disclosure.

In addition to joining nonwoven metallic fabrics as illustrated and described above with respect to FIGS. 12-1 through 15'-2, a braided metal may be joined with a nonwoven metallic fabric in further example embodiments of the present disclosure. Refer now to the example embodiment of FIGS. 16A-1 through 16A-3, which are illustrations of steps of heating surfaces of preprocessed metallic braid 1600B and preprocessed metallic fabric 300A to join the braid 1600B and metallic fabric 300A according to example embodiments of the present disclosure. FIGS. 16B and 16B' are illustrations of a metallic braid 1600B and a metallic fabric 300A joined according to an example embodiment of the present disclosure. The example embodiment of FIG. 17 is a flow diagram of a method for joining preprocessed braid 1600B and preprocessed metallic fabric 300A according to an example embodiment of the present disclosure. The example embodiment of FIGS. 12-1 through 17 are described herein in conjunction.

In some embodiments, it may be beneficial to solder a pre-tinned metallic braid to a preprocessed nonwoven metallic fabric, such as described above and illustrated with respect to FIG. 3B. In certain embodiments, soldering a pre-tinned metallic braid to preprocess nonwoven metallic fabric may require a temperature controlled soldering iron with, for example, a chisel tip. In certain embodiments, it should be understood that, due to there being less thermal mass in a pre-tinned metallic braid than in a preprocessed metallic fabric, such as metallic fabric described above, a soldering iron may be used rather than a heating block.

As illustrated in the example embodiments of FIG. 16A-1-3 and FIG. 17, pre-tinned metallic braid 1600B is aligned on a preprocessed area 890A of a metallic fabric 300A. A soldering iron is used to heat tinned end of metallic braid 1600B and, through thermal conductivity, preprocessed area 890A of metallic fabric 300A (1740). As illustrated in the example embodiment of FIG. 16A-2, once the solder begins to flow, tip of the soldering iron 1665 is dragged across metallic braid 1600B toward the end of metallic braid 1600B to apply pressure to the aligned preprocessed areas of metallic braid 1600B and metallic fabric 300A to encourage solder to flow and join metallic braid 1600B and metallic fabric 300A (1750). As illustrated in the example embodiment of FIG. 16A-3, soldering iron tip is lifted to allow joined metallic braid 1600B and metallic fabric 300A to cool (1760). In certain embodiments, flux may be applied to the pre-tinned metallic braid prior to joining to aid in the flow of solder.

In some embodiments, a soldered area may be cleaned with deionized water to remove excess flux. In some embodiments, a soldered area may be cleaned with distilled water to remove excess flux. In most embodiments, a process such as the above outlined process may result in a soldered joint connecting a metallic braid to a metallic fabric. The example embodiment of FIGS. 16B and 16B' are illustrations of respective sides of a metallic braid 1600B and a metallic fabric 300A joined according to an example embodiment of the present disclosure.

In some embodiments, it may be important to minimize the amount of time that a soldering iron spends in contact with the metallic braid or the metallic fabric. In almost all embodiments, a soldering iron may be used to attach a metallic braid should not exceed a predetermined temperature. In almost all embodiments, a soldering iron should not touch a metallic fabric. In most embodiments, a soldering iron may be in contact with a metallic braid and conduct heat indirectly to a metallic fabric. In many embodiments, a soldering iron may be tinned prior to attaching a braid. In certain embodiments, a tinning operation may be important because it is the solder on the iron that may help the solder on a metallic braid start to flow. In most embodiments, there may be no need to add additional solder to braid/fabric interface.

In certain embodiments, metallic braids may be pre-tinned and may not require any additional tinning prior to soldering to the fabric. In most embodiments, flux may be applied to a metallic braid. In most embodiments, if parts are pre-tinned, it may not be necessary to add flux.

In other embodiments, an adhesive method of joining may be used to join metallic fabric together. In some embodiments, an adhesive process may use a room temperature vulcanization (RTV) silicon as an adhesive. In certain embodiments, RTV silicon may be used raw or it may be doped to be electrically conductive. In many embodiments, doped RTV silicon may experience reduced tensile pull force performance, however it may exceed tensile tests performed on soldered joints while maintaining similar electrical performance to solder joints.

In certain embodiments, a joint for a 1" wide strip of material may be assembled by placing a pea sized dab of silicon at an end. In some embodiments, a dab may be evenly spread across a 1"×1" area of a strip. In some embodiments, a second strip may be placed over a silicon patch and a clamping force is applied until RTV silicon has fully cured. In most embodiments, once a joint is cured, it may be ready to use.

Refer now to the example embodiment of FIG. 18, which illustrates joining of material using an adhesive. Strip 1810 shows joining using an adhesive from a first view. Strip 1820 shows joining using an adhesive from a second view.

In some embodiment, the methods described herein are not limited to the specific examples described. In a further embodiments, any of the method steps may be re-ordered, combined or removed, or performed in parallel or in serial, as necessary, to achieve the results set forth above.

Although the foregoing disclosure has been described in some detail for purposes of clarity of understanding, it will be apparent that certain changes and modifications may be practiced within the scope of the appended claims. The scope of the disclosure is limited only by the claims and the disclosure encompasses numerous alternatives, modifications, and equivalents. Numerous specific details are set forth in the above description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured. Accordingly, the above implementations are to be considered as illustrative and not restrictive, and the disclosure is not to be limited to the details given herein, but may be modified within the scope and equivalents of the appended claims.

Various exemplary embodiments of the present disclosure have been described with reference to the accompanying drawings. It may be appreciated that these example embodiments are provided only for enabling those skilled in the art to better understand and further implement the present disclosure and not intended to limit the scope of the present disclosure in any manner. It should be noted that these drawings and description are only presented as exemplary embodiments and, based on this description, alternative embodiments may be conceived that may have a structure and method disclosed as herein, and such alternative embodiments may be used without departing from the principle of the disclosure as claimed in the present disclosure.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that, in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

The terms "comprise(s)," "include(s)", their derivatives, and like expressions used herein should be understood to be open (i.e., "comprising/including, but not limited to"). The term "based on" means "at least in part based on", the term "one embodiment" means "at least one embodiment", and the term "another embodiment" indicates "at least one further embodiment". Relevant definitions of other terms have been provided.

What is claimed is:

1. A method of joining non-woven metalized fabrics, the method comprising:
applying heat of a temperature at or below 260 C to a solder to join a first single layer non-woven metalized fabric, and a second single layer non-woven metalized fabric wherein the solder is selected from a group consisting of a fusible metal and an alloy, the solder and the first and second non-woven single layer metalized fabrics in thermal communication; wherein the first single layer non-woven metalized fabric and the second single layer non-woven metalized fabric are enabled to wick the solder.

2. The method of claim 1 wherein applying heat to the solder, the first single layer non-woven metallic fabric, and the second single layer non-woven metalized fabric comprises applying heat to a preprocessed area of at least one of the first and second single layer non-woven metalized fabrics.

3. The method of claim 1 further comprising:
preprocessing an area of the first single layer non-woven metalized fabric by depressing a defined area of the first single layer non-woven metalized fabric into molten solder causing the molten solder to wick into the first single layer non-woven metalized fabric.

4. The method of claim 3 wherein preprocessing the area of the first single layer non-woven metalized fabric comprises:
melting the solder onto a heating block;
aligning the defined area of the first single layer non-woven metalized fabric and the heating block; and removing the first single layer non-woven metalized fabric from the heating block to cool.

5. The method of claim 1 further comprising applying flux to a defined area of the first single layer non-woven metalized fabric.

6. The method of claim 4 further comprising aligning the preprocessed area of the first single layer non-woven metalized fabric with a preprocessed area of the second single layer non-woven metalized fabric by orienting a surface of the first single layer non-woven metalized fabric to which the solder was applied and the preprocessed area of the second single layer non-woven metalized fabric relative to each other to a desired alignment of the first and second single layer non-woven metalized fabrics.

7. The method of claim 6 wherein applying heat to a preprocessed area of at least one of the first and second single layer non-woven metalized fabrics having the solder applied comprises:
placing the aligned preprocessed areas of the first and second single layer non-woven metalized fabrics on the heating block;
applying pressure to the aligned preprocessed areas of the first and second single layer non-woven metalized fabrics on the heating block to encourage the solder to flow and join the first and second single layer non-woven metalized fabrics; and
removing the joined first and second single layer non-woven metalized fabrics from the heating block to cool.

8. The method of claim 7 further comprising applying flux to the preprocessed area of at least one of the first and second single layer non-woven metalized fabrics.

9. The method of claim 3 wherein preprocessing an area of the first metalized fabric comprises applying the solder to the nonwoven metalized fabric.

10. The method of claim 9 wherein the method further comprising preprocessing an area of the second nonwoven metalized fabric.

11. The method of claim 3 further comprising aligning a second preprocessed area of the first single layer non-woven metalized fabric with a a tinned end of a metallic braid relative to each other to a desired alignment of the metallic braid.

12. A method of joining a non-woven metalized fabric and a metal braid, the method comprising:
applying heat of a temperature at or below 260 C to join a preprocessed area of a first single layer non-woven metallic fabric and a metallic braid by using a soldering iron to heat a tinned end of the metallic braid;
applying pressure with a tip of the soldering iron to the tinned end of the metallic braid and the preprocessed area of the first metallic fabric to encourage the solder to flow and join the metallic braid and first single layer non-woven metallic fabric; and
removing the soldering iron to cool the joined metallic braid and the first single layer non-woven metallic fabric.

13. The method of claim 1 wherein the first single layer non-woven metalized fabric is metalized with at least one element selected from a group consisting of nickel, copper, and silver.

14. The method of claim 1 wherein the applying heat to join causes the solder to penetrate the first single layer non-woven metalized fabric and the second single layer non-woven metalized fabric.

15. The method of claim 1 wherein the applying heat to join causes solder to penetrate by wicking through, the first single layer non-woven metalized fabric and the second single layer non-woven metalized fabric.

16. The method of claim 1 wherein the applying heat to join causes the solder to wick through at least one of the first single layer non-woven metalized fabric and the second single layer non-woven metalized fabric.

17. The method of claim 3 further comprising aligning the preprocessed area of the first single layer non-woven metalized fabric with a preprocessed area of a second single layer non-woven metalized fabric.

18. The method of claim 1 wherein applying heat to the solder, a first single layer non-woven metalized fabric, and a second single layer non-woven metalized fabric comprises applying heat to an area of at least one of the first and second single layer non-woven metalized fabrics.

19. The method of claim 12 further comprising:
applying flux to the tinned end of the metallic braid.

20. The method of claim 12 further comprising:
preprocessing the area of the first single layer non-woven metalized fabric comprises by
melting solder onto a heating block;
aligning a defined area of the first single layer non-woven metalized fabric and the heating block; and
removing the first single layer non-woven metalized fabric from the heating block to cool.

* * * * *